United States Patent
Solano

(10) Patent No.: US 11,644,326 B2
(45) Date of Patent: May 9, 2023

(54) MACHINE LEARNING PLATFORM FOR DYNAMIC DEVICE AND SENSOR QUALITY EVALUATION

(71) Applicant: Allstate Insurance Company, Northbrook, IL (US)

(72) Inventor: Nicholas Solano, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 386 days.

(21) Appl. No.: 16/846,728

(22) Filed: Apr. 13, 2020

(65) Prior Publication Data
US 2021/0318129 A1  Oct. 14, 2021

(51) Int. Cl.
*G01C 21/34* (2006.01)
*G06Q 40/08* (2012.01)
(Continued)

(52) U.S. Cl.
CPC ..... *G01C 21/3484* (2013.01); *G01C 21/3407* (2013.01); *G01S 19/42* (2013.01); *G06N 20/00* (2019.01); *G06Q 40/08* (2013.01)

(58) Field of Classification Search
CPC . G01C 21/3484; G01C 21/3407; G01S 19/42; G01S 19/396; G06N 20/00; G06Q 40/08
See application file for complete search history.

(56) References Cited

U.S. PATENT DOCUMENTS 8,311,858 B2  11/2012  Everett et al.
9,189,895 B2  11/2015  Phelan et al.
(Continued)

FOREIGN PATENT DOCUMENTS

CN  105303830 A  2/2016
WO  2019004935 A1  1/2019

OTHER PUBLICATIONS

Johannes Paefgen et al. "Driving behavior analysis with smarthphones: Insights from a controlled field study" Conference paper, Conference: Proceedings of the 11th International Conference on Mobile and Ubiquitous Multimedia, website: https://www.researchgate.net/publication/235799293_Driving_behavior_analysis_with_smartphones_Insights_from_a_controlled_field_study Dec. 2012, pp. 1-8.

(Continued)

*Primary Examiner* — Kim T Nguyen
(74) *Attorney, Agent, or Firm* — Polsinelli PC

(57) ABSTRACT

Aspects of the disclosure relate to computing platforms that utilize improved machine learning techniques for dynamic device quality evaluation. A computing platform may receive driving data from a mobile device. Using the driving data, the computing platform may compute a plurality of driving metrics, which may include: a geopoint expectation rate score, a trips per day rank score, a consecutive geopoint time difference score, a global positioning system (GPS) accuracy rating score, and a distance between consecutive trips score. By applying a machine learning model to the plurality of driving metrics, the computing platform may compute a device evaluation score, indicating a quality of the driving data received from the mobile device. Based on the device evaluation score, the computing platform may set flags, which may be accessible by a driver score generation platform, causing the driver score generation platform to perform an action with regard to the mobile device.

20 Claims, 13 Drawing Sheets

(51) Int. Cl.
*G01S 19/42* (2010.01)
*G06N 20/00* (2019.01)

(56) References Cited

U.S. PATENT DOCUMENTS

| | | | |
|---|---|---|---|
| 9,245,391 | B2 | 1/2016 | Cook et al. |
| 9,417,076 | B2 | 8/2016 | He et al. |
| 9,494,435 | B2 | 11/2016 | Xu et al. |
| 9,535,878 | B1 | 1/2017 | Brinkmann et al. |
| 9,547,984 | B2 | 1/2017 | Gueziec et al. |
| 10,124,807 | B2 | 11/2018 | Petrucci et al. |
| 10,351,145 | B2 | 7/2019 | Izraeli et al. |
| 10,402,771 | B1 | 9/2019 | De et al. |
| 10,528,989 | B1 | 1/2020 | Irey |
| 10,529,046 | B1 | 1/2020 | Irey |
| 2006/0253307 | A1 | 11/2006 | Warren et al. |
| 2014/0095212 | A1 | 4/2014 | Gloerstad et al. |
| 2017/0103101 | A1 | 4/2017 | Mason |
| 2017/0206717 | A1 | 7/2017 | Kuhnapfel |
| 2017/0287076 | A1 | 10/2017 | Bowne et al. |
| 2019/0101914 | A1* | 4/2019 | Coleman, II ......... G08G 1/0112 |
| 2019/0228645 | A1 | 7/2019 | Sumers |
| 2021/0136526 | A1* | 5/2021 | Devine ................ H04W 4/027 |
| 2021/0394766 | A1* | 12/2021 | Crawford ............. H04K 3/45 |

OTHER PUBLICATIONS

Matt McFarland "Your smartphone knows if you're a good driver" CNN Business, website: https//money.cnn.com/2016/08/17/technology/smartphone-driver-safety/index.html Aug. 18, 2016, pp. 1-3.

Vincent Spruyt "Driving behavior modeling using smart phone sensor data" Sentiance, website: https://www.sentiance.com/2016/02/11/driving-behavior/, Feb. 11, 2016, pp. 1-16.

"Zendrive" Zendrive, website: https://zendrive.com/how-it-works/, website visited Jan. 18, 2020, pp. 1-5.

Eleni I. Vlahogianni et al. "Driving analytics using smartphones: Algorithms, comparisons and challenges" Article in Transportation Research Part C Emerging Technologies, website: https://www.researchgate.net/publication/315984585_Driving_analytics_using_smartphones_Algorithms_comparisons_and_challenges, Jun. 2017, pp. 1-11.

Jair Ferreira Junior et al. "Driver behavior profiling: An investigation with different smartphone sensors and machine learning" Research article on Plos One, website: https://journals.plos.org/plosone/article?id=10.1371/journal.pone.0174959, Apr. 10, 2017, pp. 1-16.

* cited by examiner

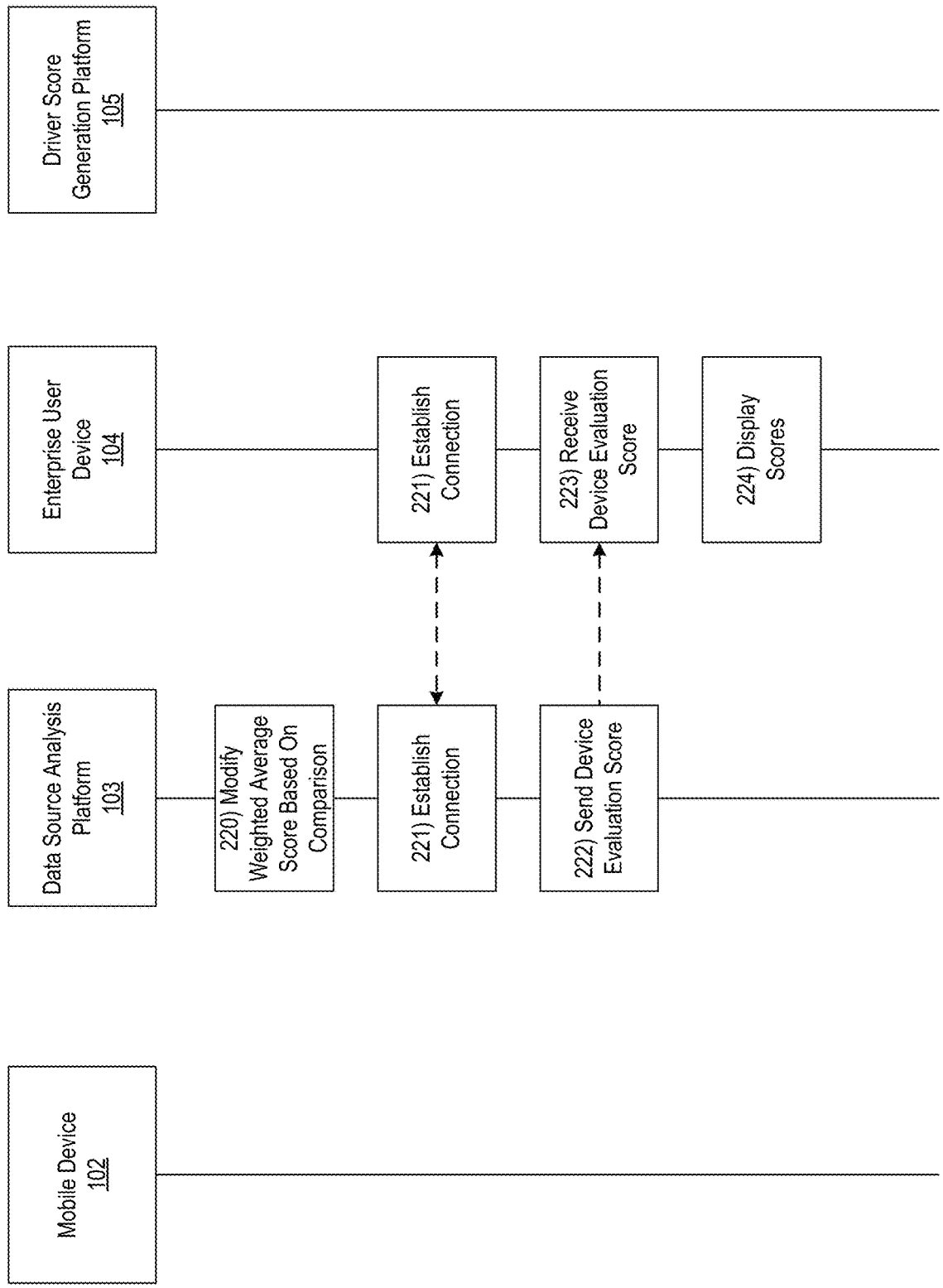

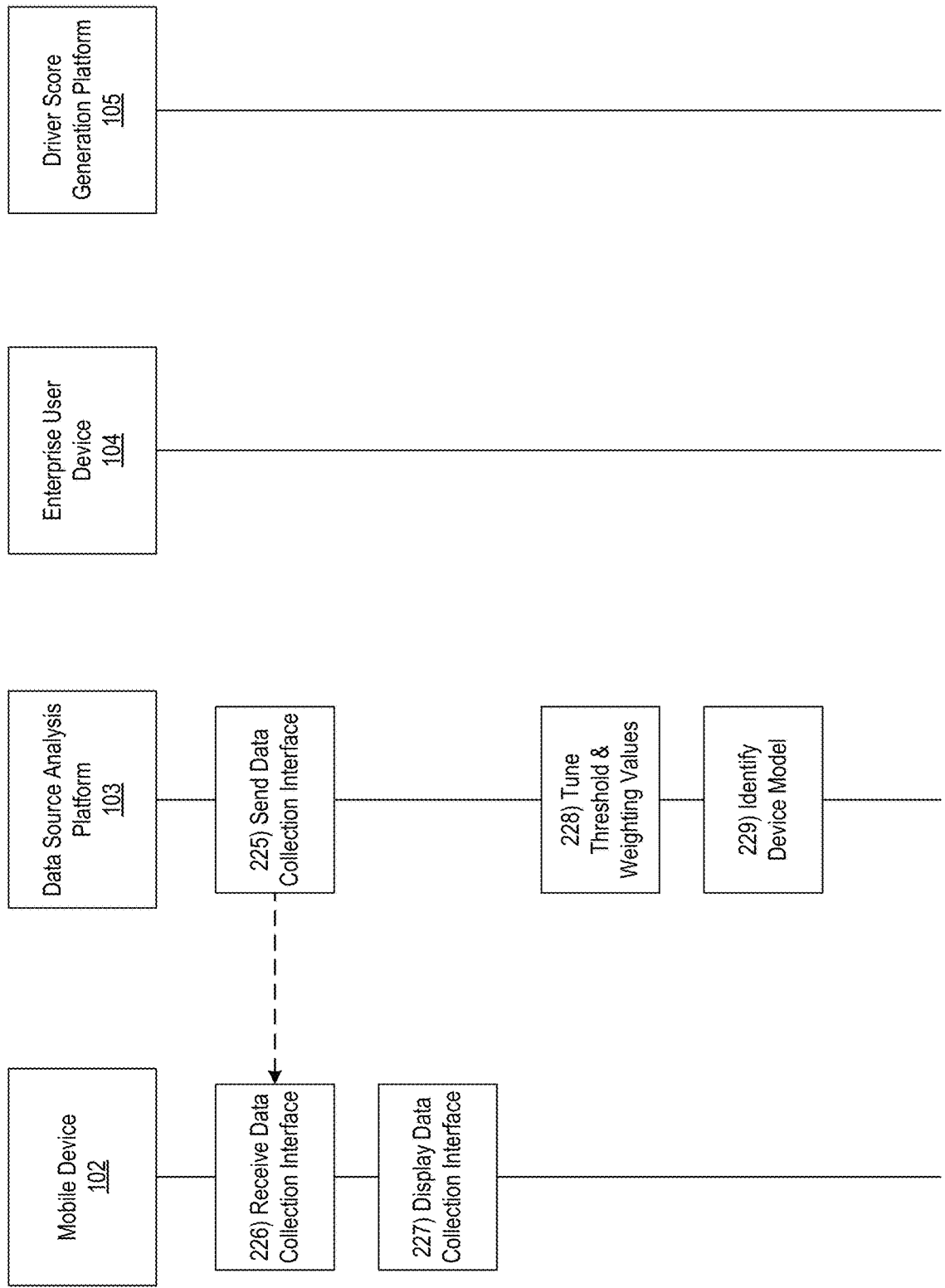

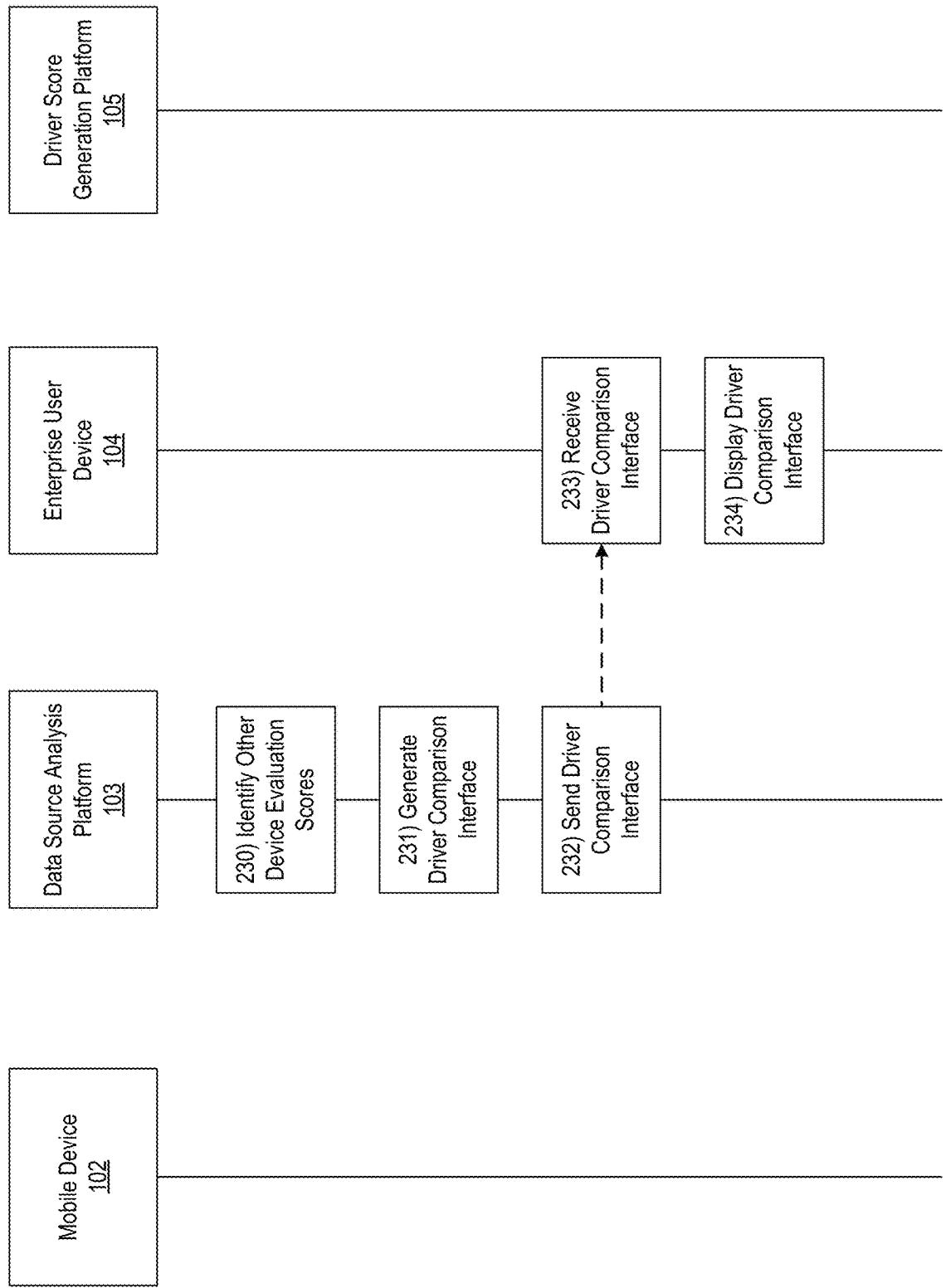

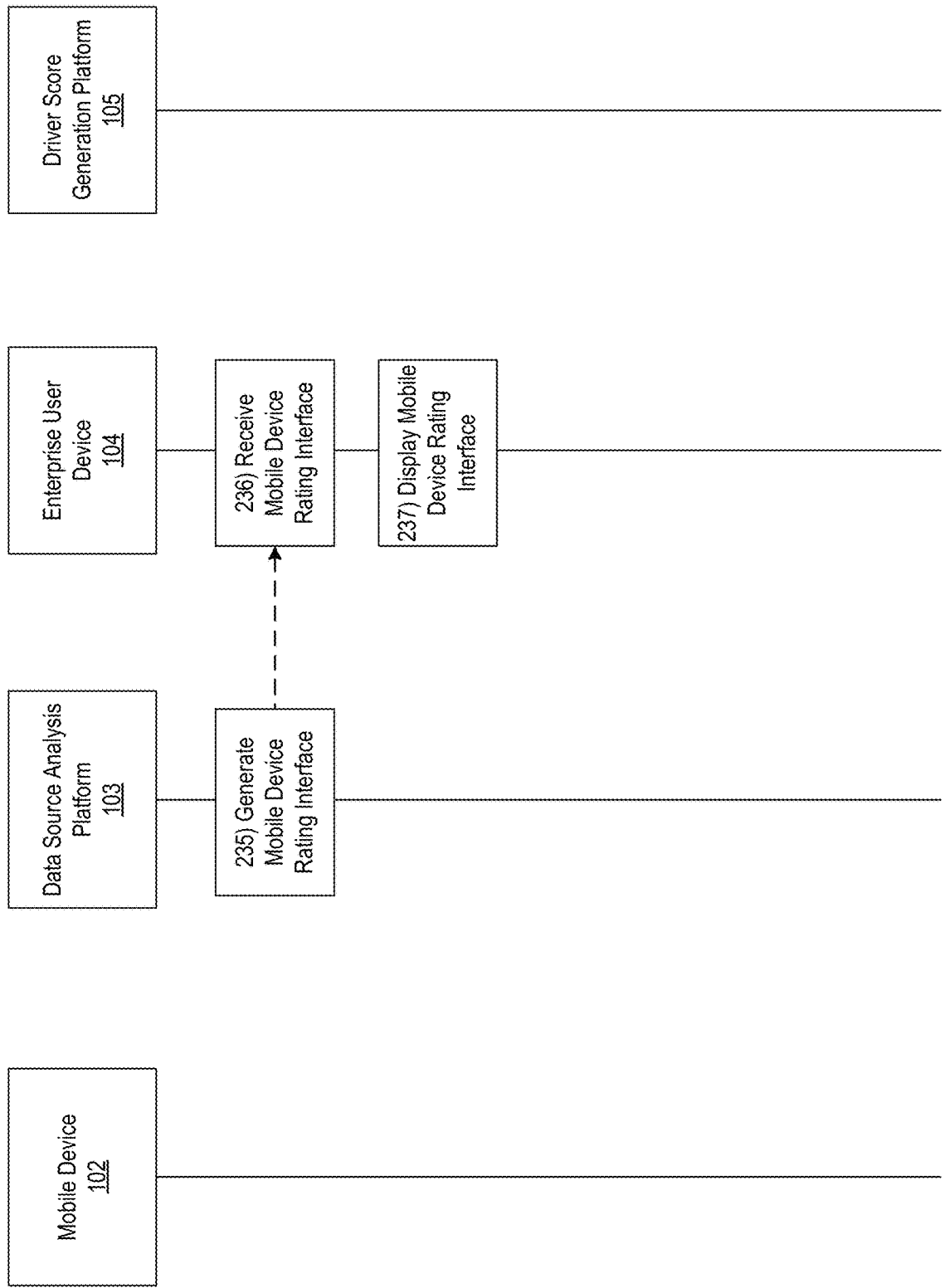

405

Enterprise User Interface

Driving Profile for "Person #1"

Driving Score: 9/10

Quality of Mobile Device: 2/10

Consider the driving score in view of the device quality.

Data Collection Evaluation Interface

Driving Profile for "Person #1"

Driving Score: 9/10

Quality of Mobile Device: 2/10

It may be time to replace your mobile device!

FIG. 5

MACHINE LEARNING PLATFORM FOR DYNAMIC DEVICE AND SENSOR QUALITY EVALUATION

BACKGROUND

Aspects of the disclosure relate to enhanced processing systems for executing machine learning algorithms and maintaining machine learning models. Many organizations and individuals evaluate telematics data to compute an overall driving score for a particular driver. In many instances, however, such telematics data may be inaccurate, which may lead to computation of a misleading driving score (e.g., which may affect rate computations, or the like). Further, such inaccuracies in telematics data may result in technical problems such as a need to use multiple devices for data collection, and cross reference the collected data across the multiple devices (e.g., which may lead to increased load on backend computing resources in performing processing of data from multiple sources and/or performing data validation procedures). Furthermore, such inaccuracies in telematics data may result in unnecessary expenditure of backend computing resources in the computation of driving scores using inaccurate or flawed data.

SUMMARY

Aspects of the disclosure provide effective, efficient, scalable, and convenient technical solutions that address and overcome the technical problems associated with evaluating quality of a device's performance in data collection. In accordance with one or more arrangements discussed herein, a computing platform having at least one processor, a communication interface, and memory may receive driving data from a mobile device (and/or another device that is configured to capture vehicle telematics data). Using the driving data, the computing platform may compute a plurality of driving metrics, which may include each of: a geopoint expectation rate score, a trips per day rank score, a consecutive geopoint time difference score, a global positioning system (GPS) accuracy rating score, and a distance between consecutive trips score. By applying a machine learning model, the computing platform may compute a device evaluation score. Based on the device evaluation score, the computing platform may set one or more flags, which may be accessible by a driver score generation platform, and accessing the one or more flags may cause the driver score generation platform to perform an action with regard to the mobile device.

In one or more instances, the driving data may be collected by the mobile device and may correspond to a plurality of driving trips performed over a predetermined period of time. In one or more instances, the computing platform may compute the geopoint expectation rate score by: 1) identifying, for each of the plurality of driving trips, an expected number of GPS points to be recorded, 2) identifying, for each of the plurality of driving trips, an actual number of GPS points recorded, 3) dividing, for each of the plurality of driving trips, the actual number of GPS points recorded by the expected number of GPS points to be recorded, resulting in a geopoint expectation rate for each of the plurality of driving trips, 4) adding the geopoint expectation rates for each of the plurality of driving trips, resulting in a total geopoint expectation rate, 5) dividing the total geopoint expectation rate by a number of driving trips included in the plurality of driving trips, resulting in the total geopoint expectation rate, and 6) computing, using a machine learning model and based on the total geopoint expectation rate, a geopoint expectation rate score, indicating a quality of data collection performed by the mobile device based on geopoint collection.

In one or more instances, the computing platform may compute the trips per day rank score by: 1) computing, using the driving data and for a driver corresponding to the driving data, an average number of driving trips per day, 2) identifying, using stored driving data corresponding to a plurality of additional drivers, an average number of driving trips per day corresponding to each of the plurality of additional drivers, 3) comparing the average number of driving trips per day corresponding to the driver to the average number of driving trips per day corresponding to each of the plurality of additional drivers, resulting in a trips per day rank for the driver, and 4) computing, using a machine learning model and based on the trips per day rank for the driver, a trips per day rank score for the driver, indicating how many driving trips a day the driver performs in comparison to the additional drivers.

In one or more instances, the computing platform may compute the consecutive geopoint time difference score by: 1) identifying an expected time difference between consecutive geopoints, 2) identifying, for each of the plurality of driving trips, an average actual time difference between consecutive geopoints, 3) comparing, for each of the plurality of driving trips, the average actual time difference between consecutive geopoints to the expected time difference between consecutive geopoints, resulting in a consecutive geopoint time difference for each of the plurality of driving trips, 4) computing an average of the consecutive geopoint time differences for the plurality of driving trips, resulting in an overall consecutive geopoint time difference, and 5) computing, using a machine learning model and based on the overall consecutive geopoint time difference, a consecutive geopoint time difference score, indicating a quality of data collection performed by the mobile device based on geopoint collection.

In one or more instances, the computing platform may compute the GPS accuracy rating score by: 1) identifying, for each of the plurality of driving trips, an accuracy radius for each GPS point included in each of the plurality of driving trips, 2) computing, for each of the plurality of driving trips, an average accuracy radius using the identified accuracy radii for each GPS point included in each of the plurality of driving trips, 3) computing, for a driver corresponding to the driving data, an overall average accuracy radius using the average accuracy radii corresponding to each of the plurality of driving trips, and 4) computing, using a machine learning model and based on the overall average accuracy radius, the GPS accuracy rating score, which may indicate a quality of data collection performed by the mobile device based on geopoint collection.

In one or more instances, the computing platform may compute the distance between consecutive trips score by: 1) identifying, between each pair of consecutive driving trips included in the plurality of driving trips, a distance between: a) an end point of a first driving trip of the pair of consecutive driving trips included in the plurality of driving trips, and b) a starting point of a second driving trip of the pair of consecutive driving trips included in the plurality of driving trips, 2) computing a median distance of the identified distances between each pair of consecutive driving trips included in the plurality of driving trips, resulting in a median distance between consecutive driving trips, and 3) computing, using a machine learning model and based on the median distance between consecutive driving trips, the distance between consecutive trips score, indicating a quality of data collection performed by the mobile device based on geopoint collection.

In one or more instances, the computing platform may identify, between each pair of consecutive driving trips included in the plurality of driving trips, a time difference between: a) an end point of a first driving trip of the pair of consecutive driving trips included in the plurality of driving trips, and b) a starting point of a second driving trip of the pair of consecutive driving trips included in the plurality of driving trips. The computing platform may identify a percentage of the identified time differences that exceed a predetermined period of time, and may compare the percentage of the identified time differences that exceed the predetermined period of time to a first predetermined percentage value.

In one or more instances, in response to identifying that the percentage of the identified time differences that exceed the predetermined period of time exceeds the first predetermined percentage value, the computing platform may subtract, from the weighted average score, a first fixed value, resulting in the device evaluation score. In response to identifying that the percentage of the identified time differences that exceed the predetermined period of time exceeds a second predetermined percentage value, greater than the first predetermined percentage value, the computing platform may subtract, from the weighted average score, a second fixed value instead of the first fixed value, resulting in the device evaluation score, wherein the second fixed value is greater than the first fixed value.

In one or more instances, the computing platform may compare the device evaluation score to a first predetermined quality assessment threshold. In response to identifying that the device evaluation score does not exceed the first predetermined quality assessment threshold, the computing platform may set a first flag corresponding to the mobile device. In these instances, the first flag may be accessible by a driver score generation platform and accessing the first flag may cause the driver score generation platform to add the mobile device to a stored list of devices from which driving data might not be used in driving score computations. In response to identifying that the device evaluation score exceeds the predetermined quality assessment threshold, the computing platform may 1) compare the device evaluation score to a second predetermined quality assessment threshold, and 2) in response to identifying that the device evaluation score does not exceed the second predetermined quality assessment threshold, set a second flag corresponding to the mobile device. In these instances, the second flag may be accessible by the driver score generation platform and accessing the second flag may cause the driver score generation platform: a) to generate an alert indicating that the device evaluation score did not exceed the second predetermined quality assessment threshold and requesting that the mobile device be replaced, and 2) send, to the mobile device, the alert.

In one or more instances, the computing platform may compute the weighted average score by applying the following formula: Weighted Average Score=$\alpha V+\beta W+\gamma X+\delta Y+\varepsilon Z/5$. In these instances, $\alpha$ may be a first weight value applied to the geopoint expectation rate score, V may be the geopoint expectation rate score, $\beta$ may be a second weight value applied to the trips per day rank score, W may be the trips per day rank score, $\gamma$ may be a third weight value applied to the consecutive geopoint time difference score, X may be the consecutive geopoint time difference score, $\delta$ may be a fourth weight value applied to the GPS accuracy rating score, Y may be the GPS accuracy rating score, $\varepsilon$ may be a fifth weight value applied to the distance between consecutive trips score, and Z may be the distance between consecutive trips score.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing improved machine learning techniques to perform dynamic device quality evaluations in accordance with one or more example arrangements discussed herein;

FIGS. 4-7 depict illustrative user interfaces for implementing improved machine learning techniques to perform dynamic device quality evaluations in accordance with one or more example arrangements discussed herein.

DETAILED DESCRIPTION

Figure 1A:
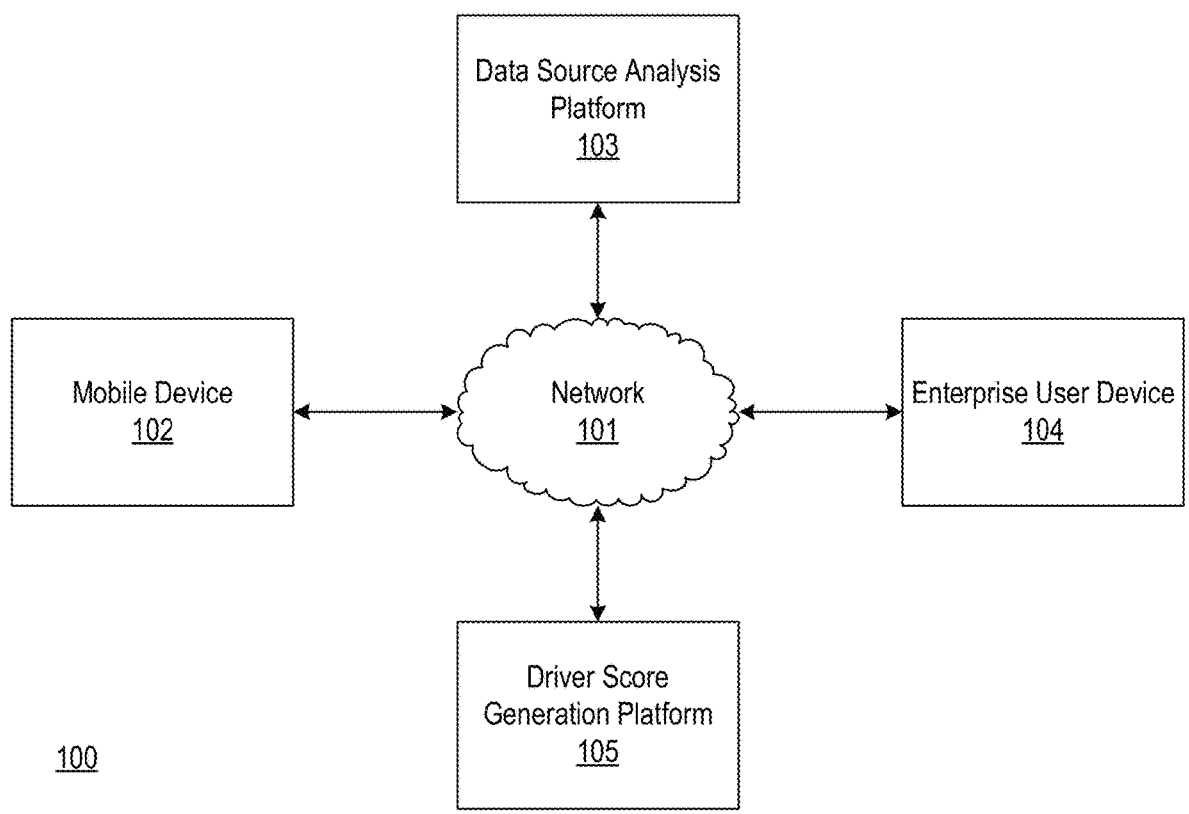
FIGS. 1A-1B depict an illustrative computing environment for implementing improved machine learning techniques to perform dynamic device quality evaluations in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the present disclosure provides systems and methods for leveraging machine learning techniques to provide automated evaluation of mobile device and/or sensor quality with respect to data collection. In short, a computing platform may utilize machine learning models and analysis to analyze quality of telematics data received from a mobile device. In some instances, the computing platform may utilize machine learning models and analysis to analyze quality of telematics data received from other devices that are configured to record GPS data. This may enable the computing platform to diagnose proficiency of these mobile devices, and identify whether or not telematics data received from a given device should be used in the calculation of driving scores (e.g., based on accuracy of the telematics data). For example, various mobile devices may have different performance abilities in collecting telematics data (e.g., poor GPS quality, missing trips because hardware cannot run an application in the background at all times, poor battery settings, settings that restrict applications considered to be unused and shut them off, or the like).

In doing so, one or more of the systems and methods described herein may improve accuracy associated with the computation of driving scores. Furthermore, by diagnosing the proficiency of mobile devices, one or more of the systems and methods described herein may reduce the need for additional sensors to be installed or otherwise implemented for the collection of telematics data (e.g., because the quality of telematics data received from the mobile devices will be ensured). In doing so, one or more of the systems and methods described herein may reduce cost associated with driving score calculations (e.g., because additional sensors need not be installed), improve driving score accuracy (e.g., by verifying quality of the received data), and/or reduce processing power used in score calculation (e.g., because data may be received from a single source, such as a mobile device, rather than a plurality of different telematics sensors and/or because data may be flagged as inaccurate prior to computation of a driving score). In some instances, in verifying received data quality, one or more of the systems and methods described herein may automatically generate and send alerts, and/or modify data collection practices based on the identified quality of the received data, which may improve calculation accuracy.

Figure 1B:
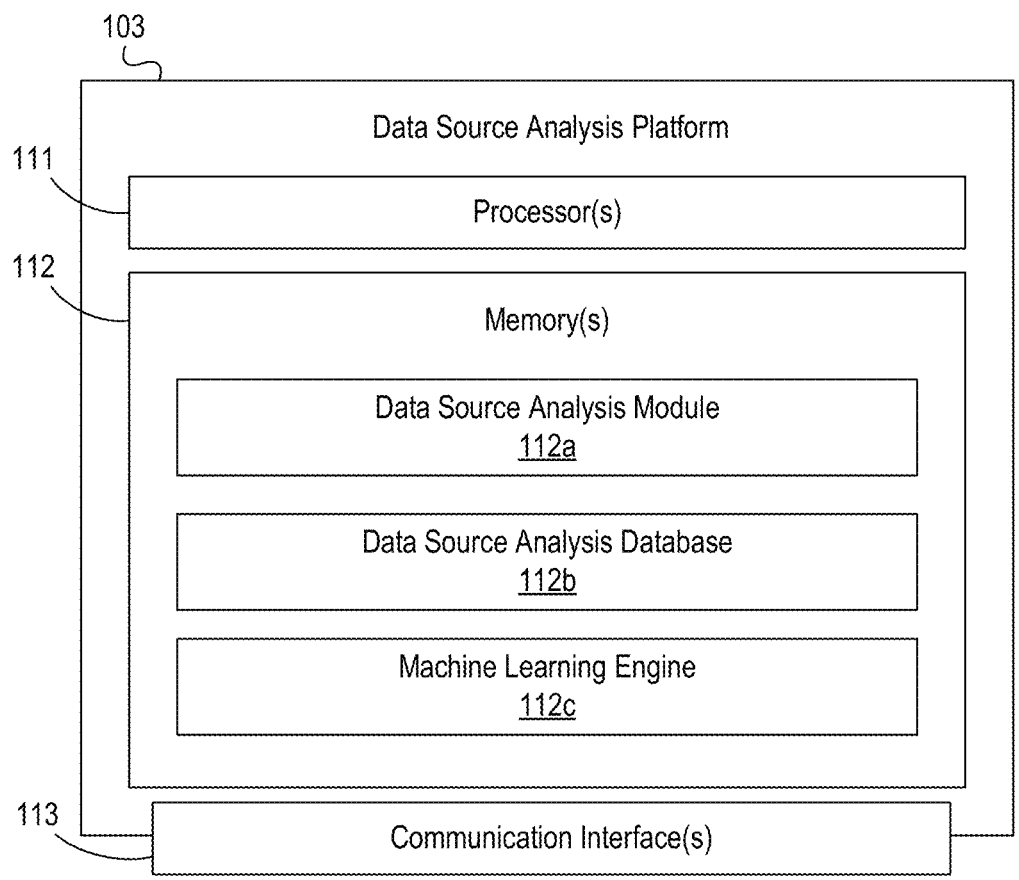

FIGS. 1A and 1B depict an illustrative computing environment for implementing improved machine learning techniques to perform dynamic device quality evaluations in accordance with one or more example embodiments. Referring to FIG. 1A, computing environment 100 may include one or more computer systems. For example, computing environment 100 may include mobile device 102, data source analysis platform 103, enterprise user device 104, and driver score generation platform 105.

Mobile device 102 may be a computing device (e.g., a smart phone, a tablet, or the like) that may be used (e.g., by a customer of an enterprise organization such as an insurance company) to collect data (e.g., global positioning system (GPS) data corresponding to driving trips, or the like). It should be understood that mobile device 102 is not necessarily usable exclusively by a customer of an insurance company. Rather, mobile device 102 may be a user device configured for use by a variety of users. In one or more instances, the mobile device 102 may be a computing device configured to receive information (e.g., from the data source analysis platform 103) and to generate/display graphical user interfaces (e.g., device evaluation interfaces, or the like) accordingly.

As illustrated in greater detail below, data source analysis platform 103 may include one or more computing devices configured to perform one or more of the functions described herein. For example, data source analysis platform 103 may include one or more computers (e.g., laptop computers, desktop computers, servers, server blades, or the like). In one or more instances, data source analysis platform 103 may be configured to maintain one or more machine learning models and/or to perform machine learning techniques to analyze driving data received from mobile devices (e.g., mobile device 102, or the like) to evaluate quality of the mobile device's data collection abilities. In some instances, the data source analysis platform 103 may be configured to dynamically tune the machine learning models and/or algorithms based on received feedback and/or as additional data is received from the mobile devices. In one or more instances, the data source analysis platform 103 may be maintained by an enterprise organization (e.g., an insurance agency, or the like).

Enterprise user device 104 may be one or more computing devices (e.g., laptop computers, desktop computers, servers, server blades, or the like) that may be used (e.g., by a representative of an organization such as an insurance company) to perform driver evaluation and/or sales activities (e.g., vehicle insurance sales, rate adjustments, discounts, targeted advertisements, or the like). It should be understood that enterprise user device 104 is not necessarily usable exclusively by a representative of an insurance company. Rather, enterprise user device 104 may be a user device configured for use by a variety of users. In one or more instances, the enterprise user device 104 may be a computing device configured to receive information (e.g., from the data source analysis platform 103, driver score generation platform 105, or the like) and to generate/display graphical user interfaces (e.g., device quality rating interfaces, driver comparison interfaces, or the like) accordingly.

Driver score generation platform 105 may be a computing device configured to receive driving data (e.g., e.g., from mobile devices such as mobile device 102, or the like) and to generate driving scores using the driving data (e.g., score that indicate a level of skill, safety, or the like associated with various drivers). In one or more instances, driver score generation platform 105 may be configured to maintain a machine learning model that may be used by the driver score generation platform 105 to generate the driving scores. In these instances, the driver score generation platform 105 may be configured to communicate with an enterprise user device (e.g., enterprise user device 104) to relay the driving scores. In some instances, the driver score generation platform 105 may be maintained by the same enterprise organization that maintains the data source analysis platform 103.

Computing environment 100 also may include one or more networks, which may interconnect one or more of mobile device 102, data source analysis platform 103, enterprise user device 104, driver score generation platform 105, or the like. For example, computing environment 100 may include a network 101 (which may, e.g., interconnect mobile device 102, data source analysis platform 103, enterprise user device 104, driver score generation platform 105, or the like).

In one or more arrangements, mobile device 102, data source analysis platform 103, enterprise user device 104, driver score generation platform 105, and/or the other systems included in computing environment 100 may be any type of computing device capable of and configured for receiving a user interface, receiving input using the user interface, and communicating the received input to one or more other computing devices. For example, mobile device 102, data source analysis platform 103, enterprise user device 104, driver score generation platform 105, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of mobile device 102, data source analysis platform 103, enterprise user device 104, and/or driver score generation platform 105 may, in some instances, be special-purpose computing devices configured to perform specific functions.

Referring to FIG. 1B, data source analysis platform 103 may include one or more processors 111, memory 112, and communication interface 113. A data bus may interconnect processor 111, memory 112, and communication interface 113. Communication interface 113 may be a network interface configured to support communication between data source analysis platform 103 and one or more networks (e.g., network 101, or the like). Memory 112 may include one or more program modules having instructions that when executed by processor 111 cause data source analysis platform 103 to perform one or more functions described herein and/or one or more databases that may store and/or otherwise maintain information which may be used by such program modules and/or processor 111. In some instances, the one or more program modules and/or databases may be stored by and/or maintained in different memory units of data source analysis platform 103 and/or by different computing devices that may form and/or otherwise make up data source analysis platform 103. For example, memory 112 may have, store, and/or include data source analysis module 112a, a data source analysis database 112b, and a machine learning engine 112c. Data source analysis module 112a may have instructions that direct and/or cause data source analysis platform 103 to execute advanced machine learning techniques for evaluating device quality, as discussed in greater detail below. Data source analysis database 112b may store information used by data source analysis module 112a and/or data source analysis platform 103 in evaluating device quality and/or in performing other functions. Machine learning engine 112c may have instructions that direct and/or cause the data source analysis platform 103 to perform evaluations of device quality, and to set, define, and/or iteratively refine optimization rules and/or other parameters used by the data source analysis platform 103 and/or other systems in computing environment 100.

Figure 2A:
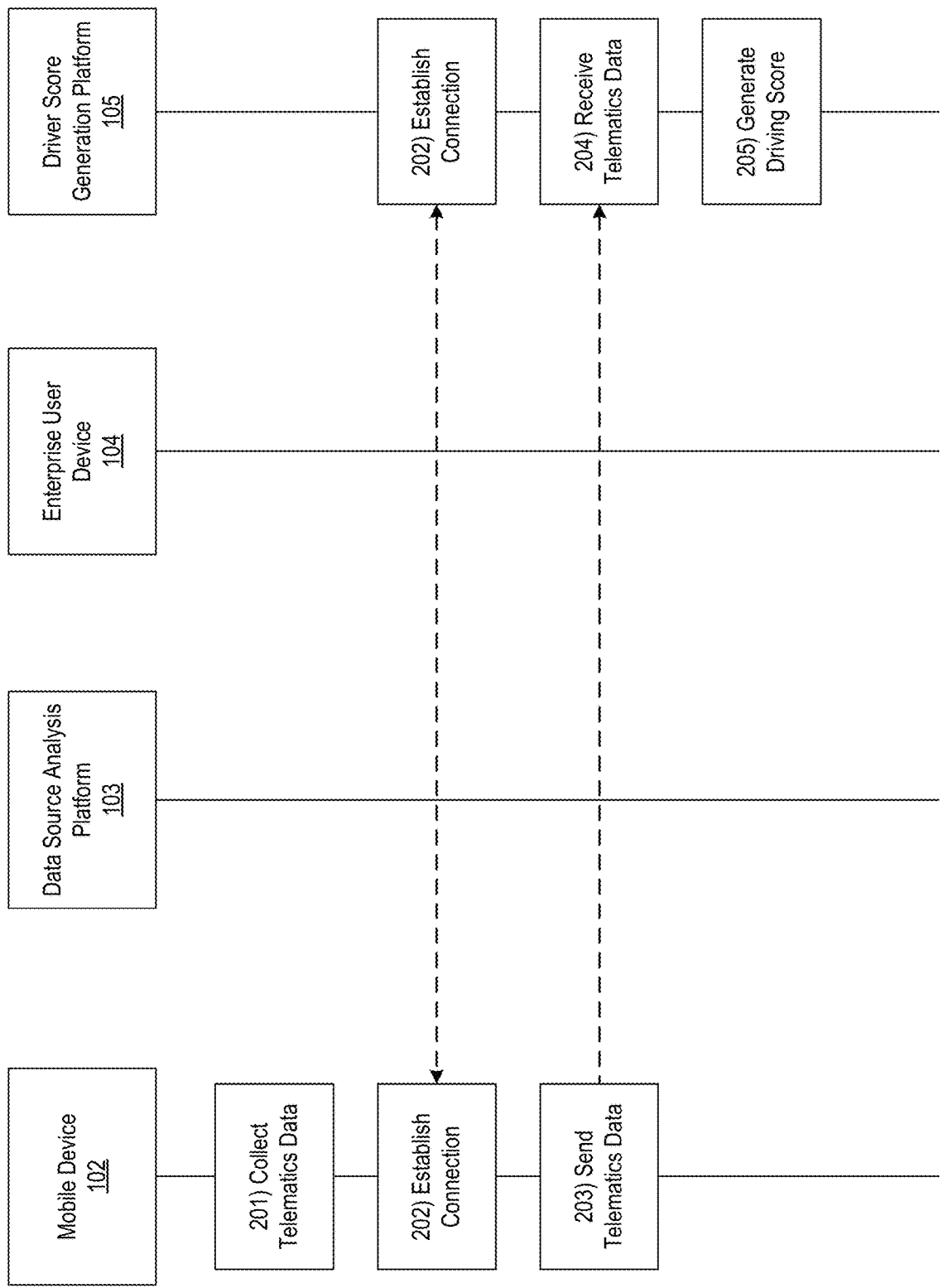

FIGS. 2A-2H depict an illustrative event sequence for implementing improved machine learning techniques to perform dynamic device quality evaluations in accordance with one or more example embodiments. Referring to FIG. 2A, at step 201, the mobile device 102 may collect telematics data. For example, the mobile device 102 may be configured with a GPS sensor, and may be configured to monitor and/or record a location of the mobile device 102 at a particular interval (e.g., every second, fifteen seconds, or the like). In these instances, the mobile device 102 may collect GPS data and may record a time, a date, latitude/longitude coordinates, a horizontal accuracy measurement, speed, or the like at which each data point is collected.

At step 202, the mobile device 102 may establish a connection with driver score generation platform 105. For example, the mobile device 102 may establish a first wireless data connection with the driver score generation platform 105 to link the mobile device 102 with the driver score generation platform 105. In some instances, the mobile device 102 may identify whether a connection is already established with the driver score generation platform 105. If a connection is already established with the driver score generation platform 105, the mobile device 102 might not re-establish the connection. If a connection is not already established with the driver score generation platform 105, the mobile device 102 may establish the first wireless data connection as described herein.

At step 203, the mobile device 102 may send the telematics data, collected at step 201, to the driver score generation platform 105. In one or more instances, the mobile device 102 may send the telematics data to the driver score generation platform 105 while the first wireless data connection is established. In some instances, the mobile device 102 may receive a user input indicating that telematics data should not be sent for a predetermined period of time (e.g., because a user is on a train, a passenger in a vehicle, walking, bicycling, or the like). In these instances, the mobile device 102 might not send the telematics data.

At step 204, the driver score generation platform 105 may receive the telematics data, sent at step 203. In one or more instances, the driver score generation platform 105 may receive the telematics data while the first wireless data connection is established.

At step 205, the driver score generation platform 105 may generate a driving score based on the telematics data received at step 204. For example, the driver score generation platform 105 may have a machine learning model configured to analyze the telematics data to generate a score representative of a driver, corresponding to the mobile device 102, and his or her level of skill, safety, or the like while driving. For example, the driver score generation platform 105 may generate a score between 1 and 100 (1 being the poorest driver and 100 being the best in terms of skill, safety, or the like) for the driver based on the telematics data. For example, in some instances, the driver score generation platform 105 may identify a cautious driver based on first telematics data and may generate a first driving score for the cautious driver. In this same example, in some instances, the driver score generation platform 105 may identify a reckless driver based on second telematics data and may generate a second driving score for the reckless driver, which may be lower than the first driving score (e.g., indicating that the reckless driver is more of a risk on the road). In some instances, in generating the driving score, the driver score generation platform 105 may use the telematics data received at step 204, but might not evaluate the quality of the telematics data and/or the mobile device that provided the telematics data (e.g., mobile device 102).

Figure 2B:
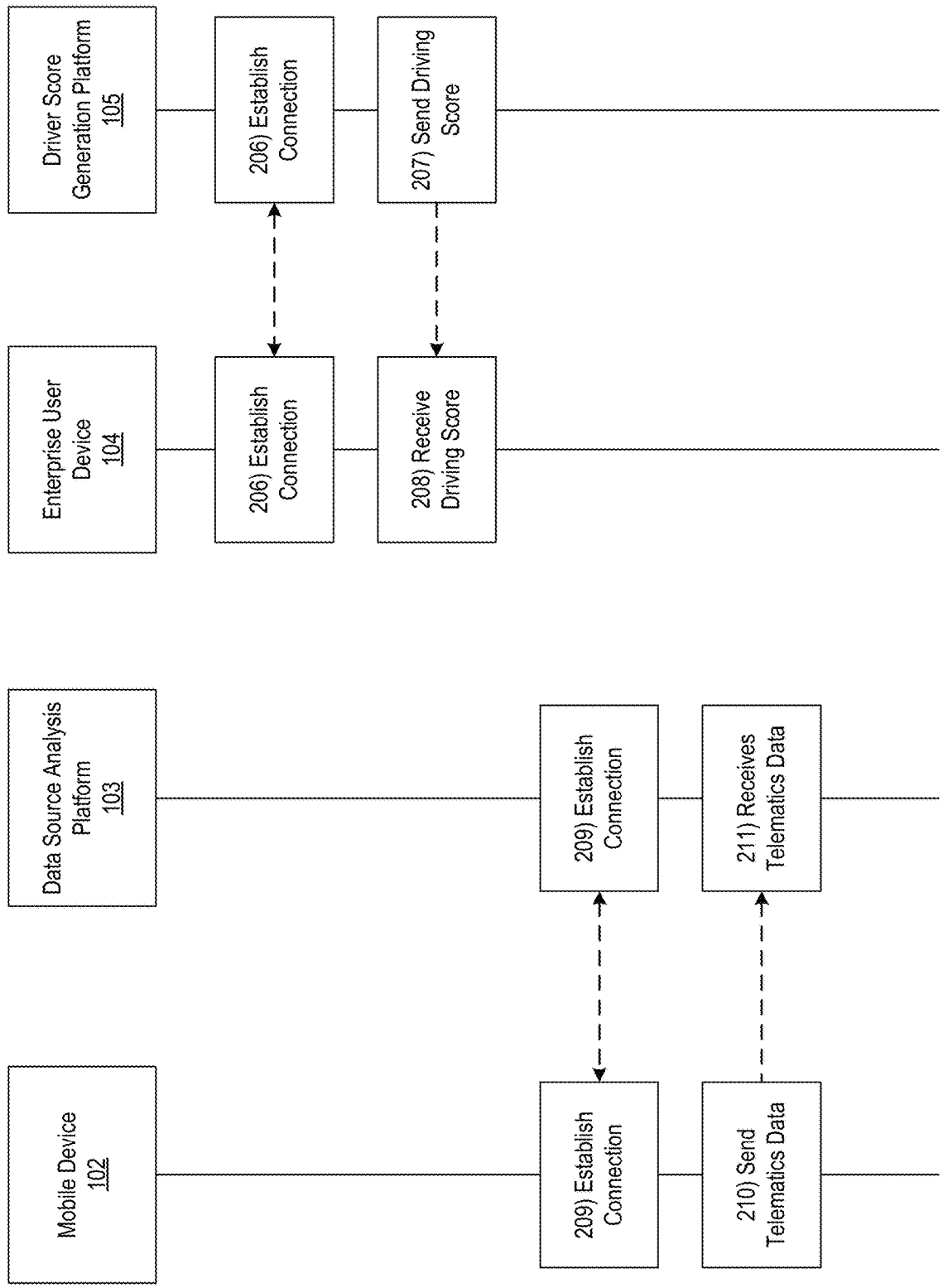

Referring to FIG. 2B, at step 206, the driver score generation platform 105 may establish a connection with enterprise user device 104. In one or more instances, the driver score generation platform 105 may establish a second wireless data connection with the enterprise user device 104 to link the driver score generation platform 105 to the enterprise user device 104. In one or more instances, the driver score generation platform 105 may identify whether or not a connection is already established with the enterprise user device 104. If a connection is already established with the enterprise user device 104, the driver score generation platform 105 might not re-establish the connection. If a connection is not already established, however, the driver score generation platform 105 may establish the second wireless data connection as described herein.

At step 207, the driver score generation platform 105 may send the driving score, generated at step 205, to the enterprise user device 104. In one or more instances, the driver score generation platform 105 may generate a message that includes the driving score, and may send the message that includes the driving score to the enterprise user device 104 while the second wireless data connection is established. In some instances, the driver score generation platform 105 may send the driving score to the enterprise user device 104 for purposes of using the driving score in determining insurance adjustments, rates, discounts, premiums, targeted advertisements, or the like.

At step 208, the enterprise user device 104 may receive the driving score sent at step 207. In one or more instances, the enterprise user device 104 may receive the message including the driving score that was sent at step 207. In some instances, the enterprise user device 104 may receive the driving score while the second wireless data connection is established. In some instances, the enterprise user device 104 may wait for a message from the data source analysis platform 103 prior to displaying the driving score for the purposes of determining insurance adjustments, rates, discounts, premiums, targeted advertisements, or the like (e.g., to evaluate quality of the telematics data used to generate the driver score). In other instances, the enterprise user device 104 may display the driving score, but may indicate that telematics data used to determining the driving score is currently under review, and quality of the telematics data may affect the driver score.

At step 209, the mobile device 102 may establish a connection with the data source analysis platform 103. In one or more instances, the mobile device 102 may establish a third wireless data connection with the data source analysis platform 103 to link the mobile device 102 to the data source analysis platform 103. In some instances, the mobile device 102 may identify whether or not a connection is already established with the data source analysis platform 103. If the mobile device 102 determines that a connection is already established with the data source analysis platform 103, the mobile device 102 might not re-establish the connection. If the mobile device 102 determines that a connection is not already established with the data source analysis platform 103, the mobile device 102 may establish the third wireless data connection as described herein.

At step 210, the mobile device 102 may send the telematics data, collected at step 201, to the data source analysis platform 103. In some instances, the mobile device 102 may send the telematics data to the data source analysis platform 103 while the third wireless data connection is established. In one or more instances, the mobile device 102 may send the same telematics data to the data source analysis platform 103 that was sent to the driver score generation platform 105 at step 203. In one or more instances, in sending the telematics data, the mobile device 102 may send GPS data, collected by the mobile device 102, corresponding to one or more driving trips performed over a predetermined period of time. In some instances, the predetermined period of time may be configured automatically by the mobile device 102, data source analysis platform 103, enterprise user device 104, or the like and/or may be configured based on user input received at the mobile device 102 (e.g., from a customer of an enterprise organization) and/or the enterprise user device 104 (e.g., from an employee of an enterprise organization).

At step 211, the data source analysis platform 103 may receive the telematics data sent at step 210. In one or more instances, the data source analysis platform 103 may receive the telematics data via the communication interface 113 and while the third wireless data connection is established. In one or more instances, in receiving the telematics data, the data source analysis platform 103 may receive GPS data, collected by the mobile device 102, corresponding to one or more driving trips.

Figure 2C:
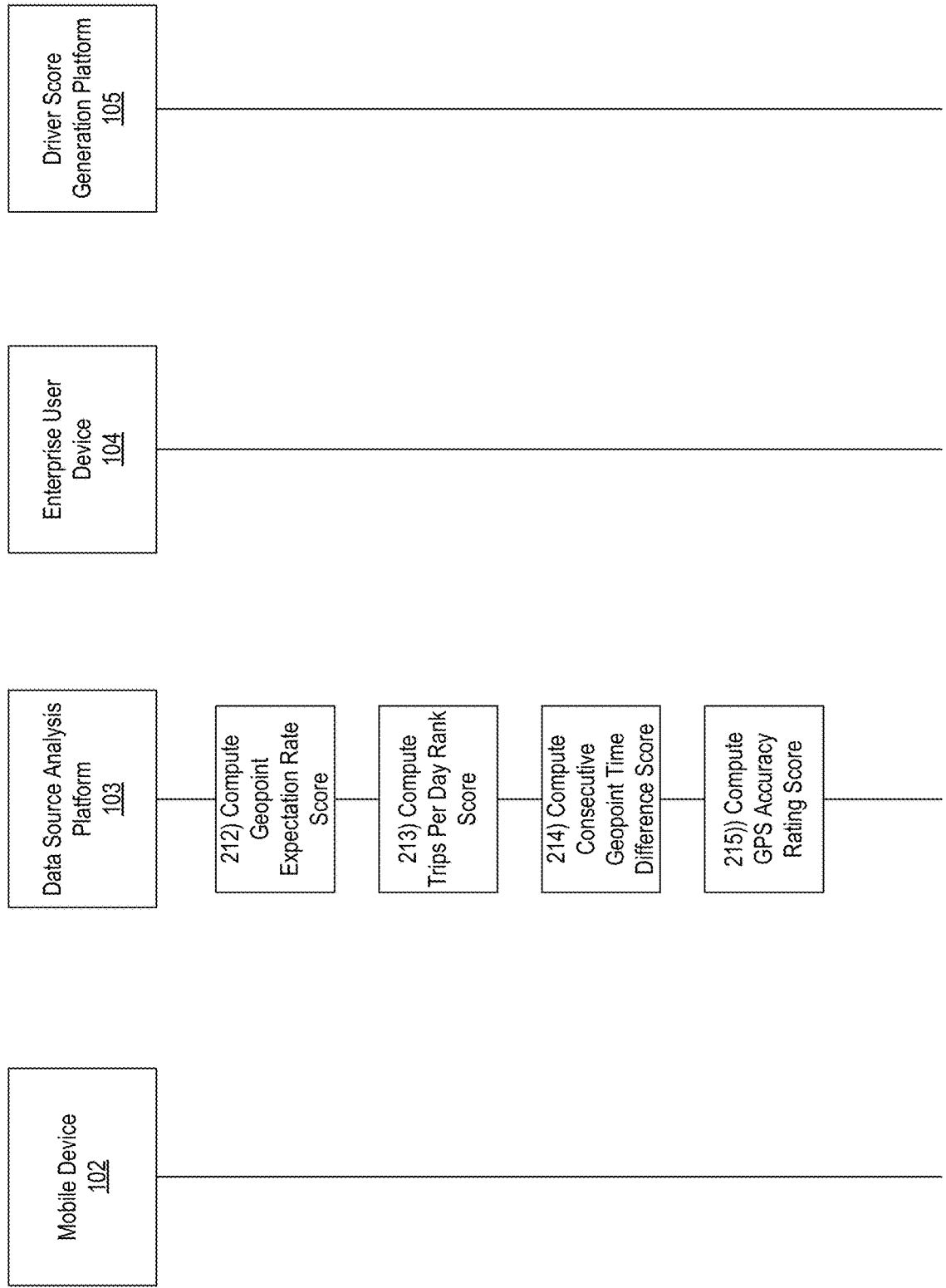

Referring to FIG. 2C, at step 212, the data source analysis platform 103 may compute a geopoint expectation rate score using the telematics data received at step 211. For example, the data source analysis platform 103 may be configured to identify that the mobile device 102 is not functioning properly if GPS points are not being recorded at their anticipated time interval. Furthermore, it may be important for the data source analysis platform 103 to identify gaps in data collection by the mobile device 102 because events may be missed that may affect a driving score (e.g., missing a hard braking event that would otherwise decrease a driving score may result in an inflated driving score). In one or more instances, in computing the geopoint expectation rate score, the data source analysis platform 103 may identify, for each of the one or more driving trips, an expected number of GPS points to be recorded. For example, the data source analysis platform 103 may determine that the mobile device 102 is configured to record a GPS point every fifteen seconds, and thus may divide a total time of each driving trip by fifteen to identify an expected number of GPS points to be recorded for each driving trip. In some instances, the data source analysis platform 103 may determine the time interval at which GPS points are recorded based on information received from the mobile device 102, information accessed in a stored database (e.g., a database (e.g., data source analysis database 112b, or the like) storing correlations between mobile device types and their corresponding GPS recordation time intervals), or the like. Accordingly, the data source analysis platform 103 may determine that for each of the driving trips, GPS points should be recorded at the same time interval (e.g., fifteen seconds or the like).

After identifying the expected number of GPS points to be recorded for each driving trip, the data source analysis platform 103 may identify, for each driving trip, an actual number of GPS points recorded. For example, in receiving the telematics data, the data source analysis platform 103 may receive a plurality of GPS data points, each corresponding to a particular driving trip. Accordingly, the data source analysis platform 103 may compute a number of GPS data points corresponding to each driving trip to identify the actual number of GPS points recorded for each driving trip.

Once an expected number of GPS points to be recorded for each driving trip and an actual number of GPS points to be recorded for each driving trip have been identified, the data source analysis platform 103 may divide, for each driving trip, the actual number of GPS points recorded by the expected number of GPS points to be recorded, which may result in a geopoint expectation rate for each of the driving trips.

After computing the geopoint expectation rates for each of the driving trips, the data source analysis platform 103 may add the geopoint expectation rates together to compute a total geopoint expectation rate, and may then divide the total geopoint expectation rate by a number of driving trips corresponding to the telematics data received at step 211. In doing so, the data source analysis platform 103 may compute an overall geopoint expectation rate, which may be a value between 0 and 1 representing how many GPS points were recorded versus how many were expected to be recorded in the telematics data.

Once the overall geopoint expectation rate is computed, the data source analysis platform 103 may compute a geopoint expectation rate score indicating how well the mobile device 102 performed in collecting GPS data. For example, the data source analysis platform 103 may generate a geopoint expectation rate score of 0.1 if the overall geopoint expectation rate is below 45%, a geopoint expectation rate score of 1 if the overall geopoint expectation rate is above 90%, or the like. In some instances, these calculations of geopoint expectation rate scores may be performed by the data source analysis platform 103 using a machine learning model, which may include the correlations between overall geopoint expectation rates and geopoint expectation rate scores (e.g., such as the correlations described above), and may dynamically update based on feedback data (e.g., if 90% of drivers are receiving a geopoint expectation rate score of 0.1 the machine learning model may be too harsh, if 90% of drivers are receiving a geopoint expectation rate score of 1 the machine learning model may be too lenient, or the like).

At step 213, the data source analysis platform 103 may compute a trips per day rank score. For example, the data source analysis platform 103 may be configured to identify that if a certain number of trips are not being recorded daily, the mobile device 102 might not be collecting telematics data corresponding to all performed driving trips. Accordingly, the data source analysis platform 103 may identify, using stored driving data corresponding to a plurality of drivers (e.g., in a particular town, city, state, or the like), an average number of driving trips per day performed by these drivers (e.g., four trips a day, or the like). Similarly, the data source analysis platform 103 may compute an average number of driving trips per day for the driver corresponding to the telematics data. For example, in receiving the telematics data at step 211, the data source analysis platform 103 may receive telematics data corresponding to a plurality of driving trips, which may each correspond to a particular date, time, or the like. Accordingly, the data source analysis platform 103 may identify, using the dates corresponding to each of the driving trips, an average number of driving trips per day for the driver (e.g., identify a number of driving trips for each day and divide by the total number of days corresponding to the telematics data). The data source analysis platform 103 may then compare the average number of driving trips per day for the driver to the average number of driving trips per day for the plurality of drivers. For example, to compute the trips per day rank, the data source analysis platform 103 may divide 3 (e.g., an example number of driving trips per day for the driver) by 4 (e.g., an example number of driving trips per day for the plurality of drivers, which may equal 0.75.

After computing the trips per day rank, the data source analysis platform 103 may compute, using a machine learning model, the trips per day rank score, which may be a value between 0.25 and 1 indicating how much the driver drives in comparison to others. In some instances, a number of trips per day might not indicate, to the data source analysis platform 103, a problem with data recording. Accordingly, the data source analysis platform 103 may add a buffer value (e.g., 0.25, or the like), to the trips per day rank, to compute the trips per day rank score. For example, if the data source analysis platform 103 computed a trips per day rank of 0.75, the data source analysis platform 103 may compute a trips per day rank score of 1 (0.75+0.25=1). In some instances, the data source analysis platform 103 might not provide extra rank for trips per day ranks that exceed a value of 1 (e.g., 1.5, or the like). Rather, the data source analysis platform 103 may default to a trips per day rank score of 1 in these instances. In some instances, the data source analysis platform 103 may be configured to dynamically adjust the machine learning model based on feedback. For example, if the data source analysis platform 103 identifies that adding 0.25 to each trips per day rank is resulting in a trips per day rank score that exceeds 1 (e.g., and then defaults back to a value of 1) 90% of the time, the data source analysis platform 103 may determine that a value of 0.1 should be added to the trips per day rank rather than 0.25.

At step 214, the data source analysis platform 103 may compute a consecutive geopoint time difference score. For example, the data source analysis platform 103 may use a machine learning model to compute the geopoint time difference score for the driver based on the telematics data received at step 211. In one or more instances, the data source analysis platform 103 may identify an expected time difference between consecutive geopoints. For example, the data source analysis platform 103 may determine that the mobile device 102 is configured to record a GPS point every fifteen seconds, and thus may divide a total time of each driving trip by fifteen to identify an expected number of GPS points to be recorded for each driving trip. In some instances, the data source analysis platform 103 may determine the time interval at which GPS points are recorded based on information received from the mobile device 102, information accessed in a stored database (e.g., a database (e.g., data source analysis database 112b, or the like) storing correlations between mobile device types and their corresponding GPS recordation time intervals), or the like. Accordingly, the data source analysis platform 103 may determine that for each of the driving trips, GPS points should be recorded at the same time interval (e.g., fifteen seconds or the like). In some instances, rather than determining the expected time difference between geopoints for a second time, the data source analysis platform 103 may use the expected time difference between geopoints identified at step 212.

After identifying the expected time difference between geopoints, the data source analysis platform may identify, for each of the driving trips, an average actual time difference between consecutive geopoints. For example, in receiving the telematics data, the data source analysis platform 103 may receive a plurality of GPS data points, each corresponding to a particular time during a particular driving trip. Accordingly, the data source analysis platform 103 may compute a time difference between each pair of consecutive GPS data points for each driving trip, add these time differences together, and divide the sum by the total number of pairs of consecutive GPS data points for each driving trip. In some instances, this may result in an average time difference between each pair of consecutive GPS data points for each driving trip. The data source analysis platform 103 may then add the average time differences for each driving trip together, and divide the sum by the total number of driving trips to compute an overall consecutive geopoint time difference.

Once the overall consecutive geopoint time difference is computed, the data source analysis platform 103 may compute a geopoint time difference score (e.g., a value between 0.1 and 1) indicating how well the mobile device 102 performed in collecting GPS data. For example, the data source analysis platform 103 may compute a geopoint time difference score of 0.1 if the overall consecutive geopoint time difference exceeds 3, whereas the data source analysis platform 103 may compute a geopoint time difference score of 1 if the overall consecutive geopoint time difference is below 1. Such correlations may be stored using a machine learning model, which may dynamically update based on feedback data (e.g., if 90% of drivers are receiving a geopoint time difference score of 0.1 the machine learning model may be too harsh, if 90% of drivers are receiving a geopoint time difference score of 0.9 the machine learning model may be too lenient, or the like).

At step 215, the data source analysis platform 103 may compute a GPS accuracy rating score. For example, in receiving the telematics data, the data source analysis platform 103 may receive GPS data that includes accuracy metrics (e.g., GPS data in a condensed city may have larger radii, and thus may be less accurate, than GPS data in wide open spaces). For example, the data source analysis platform 103 may identify, using the accuracy metrics and for each GPS data point, a radius in meters for where the GPS data point could be (an accuracy radius). Accordingly, the data source analysis platform 103 may identify an accuracy radius for each GPS data point in each driving trip. For each of the driving trips, the data source analysis platform 103 may then compute an average accuracy radius by adding the accuracy radii, for the corresponding driving trip, together and then dividing the sum of the accuracy radii by the number of accuracy radii identified for the corresponding driving trip. The data source analysis platform 103 may then compute an overall average accuracy radius for the telematics data by adding the average accuracy radii for each driving trip together and then dividing by the number of driving trips. In some instances, the data source analysis platform 103 might not generate average accuracy radii for each of the driving trips, but rather may merely compute an overall average accuracy radii for the telematics data. After computing the overall average accuracy radii, the data source analysis platform 103 may use a machine learning model to compute a GPS accuracy rating score (e.g., between 0.1 and 1) based on the overall average accuracy radii. For example, the data source analysis platform 103 may compute a GPS accuracy rating score of 0.1 if the overall average accuracy radii exceeds 20 meters, a GPS accuracy rating score of 1 if the overall average accuracy radii is lower than 5 m, or the like. In some instances, the data source analysis platform 103 may store these correlations using the machine learning model, and may dynamically update the correlations based on feedback (e.g., if 90% of drivers receive a GPS accuracy rating score of 1 the machine learning model may be too lenient, whereas if 90% of drivers receive a GPS accuracy rating score of 0.1 the machine learning model may be too harsh.

Figure 2D:
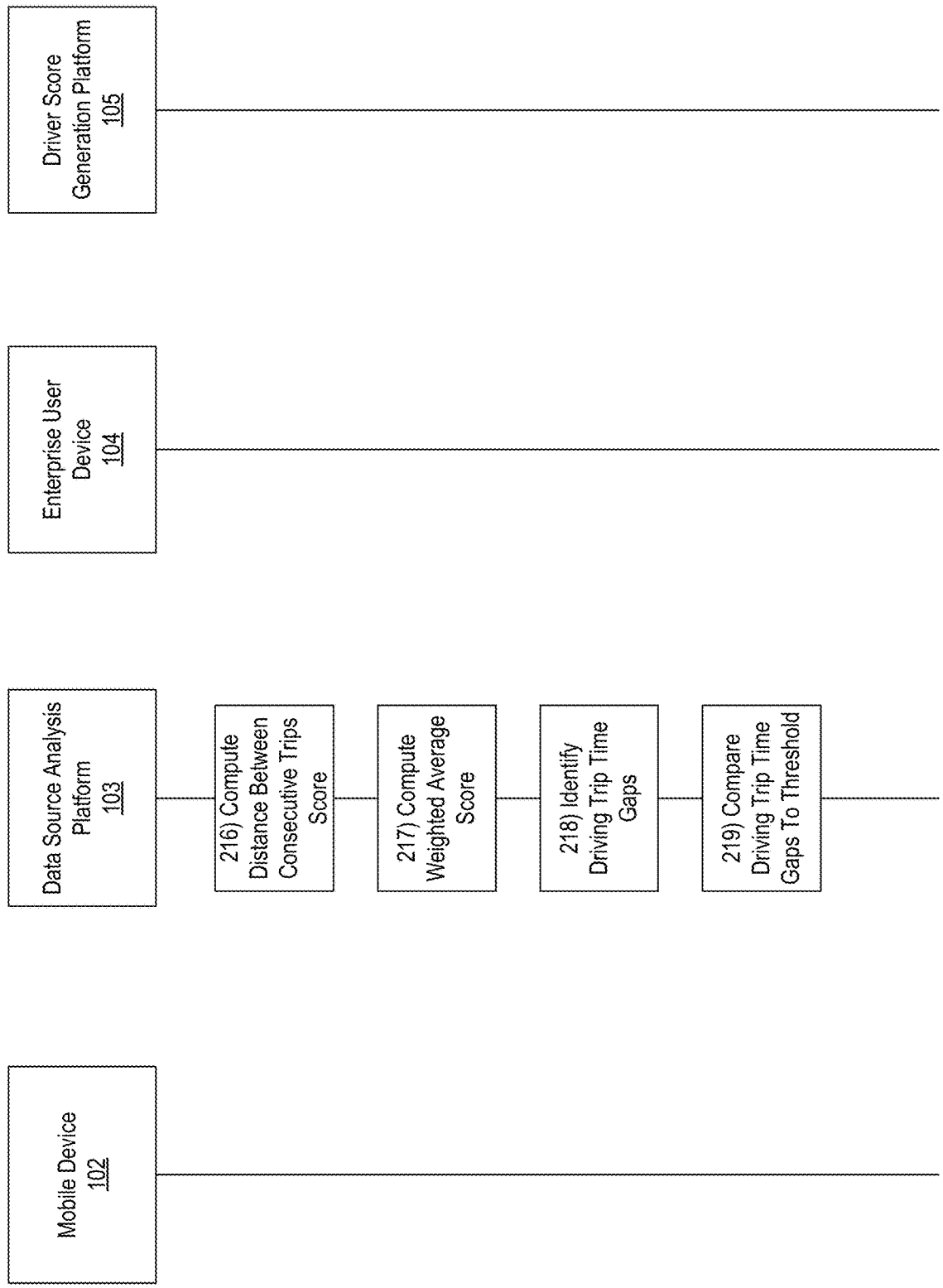

Referring to FIG. 2D, at step 216, the data source analysis platform 103 may compute a distance between consecutive trips score. For example, the data source analysis platform 103 may use a machine learning model to compute the distance between consecutive trips score based on the telematics data received at step 211. In some instances, in receiving the telematics data, the data source analysis platform 103 may receive GPS data, which may indicate start and end locations and times for driving trips. In general, a driver begins a driving trip from a location that a previous driving trip ended (e.g., parks the car, and begins the next trip wherever the car is parked). Accordingly, the data source analysis platform 103 may identify whether or not there is a distance gap between where consecutive trips finish/begin (e.g., whether the mobile device 102 begins collecting telematics data within a predetermined time interval of when a trip begins, or whether telematics data from beginnings of driving trips are being missed). If the data source analysis platform 103 identifies that there is a distance gap, the data source analysis platform 103 may determine that data corresponding to at least one driving trip may be missing.

To compute the distance between consecutive trips score, the data source analysis platform 103 may identify, between each pair of consecutive driving trips, a distance between an end point of a first driving trip (occurring prior to a second driving trip in a consecutive manner) and a starting point of the second driving trip (occurring after the first driving trip in a consecutive manner). The data source analysis platform 103 may then compute a median distance between each pair of consecutive driving trips included in the telematics data (e.g., add the distances between trips and divide by the number of driving trip pairs), resulting in a median distance between consecutive trips. Based on the median distance between consecutive trips and using the machine learning model, the data source analysis platform 103 may compute the distance between consecutive trips score (e.g., a value between 0.1 and 1). In some instances, the data source analysis platform 103 may compute the distance between consecutive trips score using a haversine calculation, or the like. For example, the data source analysis platform 103 may compute a distance between consecutive trips score of 1 if the median distance between consecutive trips is less than 1 mile, and may compute a distance between consecutive trips score of 0.1 if the median distance between consecutive trips is greater than 5 miles. In some instances, the data source analysis platform 103 may store these correlations using the machine learning model, and may dynamically update the machine learning model based on feedback (e.g., if 90% of drivers of a distance between consecutive trips score of 0.1 the model may be too harsh and if 90% of drivers have a distance between consecutive trips score of 1 the model may be too lenient).

At step 217, the data source analysis platform 103 may compute a weighted average score based on the geopoint expectation rate score, the trips per day rank score, the consecutive geopoint time difference score, the global positioning system (GPS) accuracy rating score, and the distance between consecutive trips score. In some instances, the data source analysis platform 103 may use a machine learning model to compute the weighted average score, which may maintain a plurality of weighting values to be applied to each of the geopoint expectation rate score, the trips per day rank score, the consecutive geopoint time difference score, the global positioning system (GPS) accuracy rating score, and the distance between consecutive trips score. For example, in computing the weighted average score, the data source analysis platform 103 may apply the following equation:

$$\text{Weighted Average Score} = \frac{\alpha V + \beta W + \gamma X + \delta Y + \varepsilon Z}{5}.$$

In these instances, α may be a first weight value applied to the geopoint expectation rate score, V may be the geopoint expectation rate score, β may be a second weight value applied to the trips per day rank score, W may be the trips per day rank, γ may be a third weight value applied to the geopoint time difference score, X may be the geopoint time difference score, δ may be a fourth weight value applied to the GPS accuracy rating score, Y may be the GPS accuracy rating score, ε may be a fifth weight value applied to the distance between consecutive driving trips score, and Z may be the distance between consecutive driving trips score.

As an example, the data source analysis platform 103 may have stored values of α=0.5, β=1.5, γ=0.5, δ=0.5, and ε=2, which may have been determined by the data source analysis platform 103 based on how indicative each of the various scores are to an evaluation of the quality of data collection performed by the mobile device 102. In some instances, the data source analysis platform 103 may dynamically tune the weight values based on feedback. For example, in some instances, the data source analysis platform 103 may determine that the distance between consecutive driving trips score is too highly weighted and that c should be reduced to 1. For example, the data source analysis platform 103 may determine that the driver does not actually own a car, and frequently obtains vehicles through rental services, car sharing services, or the like, resulting in trips often starting and stopping in different locations. In this example, the fact that there is a large distance between consecutive driving trips might not be indicative of the quality of data collection by the mobile device 102, and thus should not be weighted as highly by the data source analysis platform 103.

At step 218, the data source analysis platform 103 may identify driving trip time gaps corresponding to consecutive driving trips. For example, for each of the pairs of consecutive driving trips represented by the telematics data, the data source analysis platform 103 may use time/date values corresponding to the start/end GPS points, as identified in step 216, to compute a time difference between an endpoint of a driving trip and a starting point of a subsequent driving trip.

At step 219, the data source analysis platform 103 may compare the time differences, computed at step 218, to a predetermined period of time (e.g., 18 hours), and may identify a percentage of the time differences that exceed the predetermined period of time. In some instances, the data source analysis platform 103 may dynamically adjust the predetermined period of time. For example, if the data source analysis platform 103 determines that 90% of drivers exceed the predetermined period of time 100% of the time, the data source analysis platform 103 may increase the predetermined period of time. Similarly, if the data source analysis platform 103 determines that 1% of drivers exceed the predetermined period of time 100% of the time, the data source analysis platform 103 may decrease the predetermined period of time. In some instances, the data source analysis platform 103 may configure the predetermined period of time based on a city, zip code, concentration of GPS data, or the like. For example, if a driver corresponding to the mobile device 102 lives in a city, he or she may frequently walk, use ride share, use public transportation, or the like while keeping a vehicle parked for long periods of time. In these instances, the data source analysis platform 103 may be configured to determine that these long time differences are not an indication of poor data quality and/or missed driving trips, but rather just a function of the local environment. In these instances, the data source analysis platform 103 may set the predetermined period of time to 0, effectively eliminating relevance of the time difference.

Referring to FIG. 2E, at step 220, the data source analysis platform 103 may modify the weighted average score based on the comparison of the time differences to the predetermined period of time performed at step 219. For example, the data source analysis platform 103 may have predetermined percentage thresholds defined within a machine learning model, and may modify the weighted average score, using the machine learning model, according to rules for the predetermined percentage thresholds. For example, if the data source analysis platform 103 identifies that between 20-29% of the time differences exceed the predetermined period of time, the data source analysis platform 103 may reduce the weighted average score by 0.2 (e.g., subtract 0.2 from the weighted average). In this example, if the data source analysis platform 103 identifies that between 30-39% of the time differences exceed the predetermined period of time, the data source analysis platform 103 may reduce the weighted average score by 0.4 (e.g., subtract 0.4 from the weighted average). Similarly, in this example, if the data source analysis platform 103 identifies that 40% of more of the time differences exceed the predetermined period of time, the data source analysis platform 103 may reduce the weighted average score by 0.5 (e.g., subtract 0.5 from the weighted average). In this example, however, if less than 20% of the time differences exceed the predetermined period of time, the data source analysis platform 103 might not modify the weighted average score (or may modify the weighted average score by 0 for purposes of illustration). As a result, the data source analysis platform 103 may compute a device evaluation score, indicating a quality of telematics data collected by the mobile device 102.

In one or more instances, the data source analysis platform 103 may dynamically tune the predetermined percentage thresholds based on feedback so that a particular percentage of drivers fall into threshold window. For example, the data source analysis platform 103 may adjust the 40% percentage threshold to maintain a fixed percentage of 25% of drivers exceeding the threshold (e.g., if 30% of drivers are exceeding the threshold, the data source analysis platform 103 may increase the 40% percentage threshold to 50%, or the like).

In some instances, the data source analysis platform 103 may set one or more flags and/or perform one or more actions based on the device evaluation score. For example, in one or more instances, the data source analysis platform 103 may compare the device evaluation score to a first predetermined quality assessment threshold. In these instances, in response to determining that the device evaluation score does not exceed the first predetermined quality assessment threshold, the data source analysis platform 103 may set a first flag corresponding to the mobile device 102. In some instances, the data source analysis platform 103 may set the first flag in a repository available to the enterprise user device 104, the driver score generation platform 105, or the like, and setting the first flag may cause the enterprise user device 104, the driver score generation platform 105, or the like to perform one or more actions. For example, the driver score generation platform 105 may access the first flag, and in response to accessing the first flag, may add the mobile device 102 to a stored list of devices from which driving data should not be used for the computation of driving scores (e.g., based on the first flag, the driver score generation platform 105 may cease using telematics data from the mobile device 102 for the computation of driving scores because the telematics data may be sufficiently unreliable and thus would result in an inaccurate driving score). In some instances, in response to determining that the device evaluation score exceeds the first predetermined quality assessment threshold, the data source analysis platform 103 may compare the device evaluation score to a second predetermined quality assessment threshold. In these instances, in response to determining that the device evaluation score does not exceed the second predetermined quality assessment threshold, the data source analysis platform 103 may set a second flag corresponding to the mobile device. In some instances, the data source analysis platform 103 may set the second flag in a repository available to the enterprise user device 104, the driver score generation platform 105, or the like, and setting the first flag may cause the enterprise user device 104, the driver score generation platform 105, or the like to perform one or more actions (which may e.g., be different than the actions caused by the first flag). For example, the driver score generation platform 105 may access the second flag, and in response to accessing the second flag, may generate an alert indicating that the device evaluation score did not exceed the second predetermined quality assessment threshold, and requesting that the mobile device 102 be replaced. In this example, the data source analysis platform 103 may then send the alert to the mobile device 102, which may cause display of the alert (e.g., provide a warning that data collection quality of the mobile device 102 is poor, and may soon be unusable for driving score computation).

In one or more instances, the data source analysis platform 103 may dynamically tune the predetermined quality assessment thresholds based on feedback so that a particular percentage of drivers fall into threshold window. For example, the data source analysis platform 103 may adjust the first predetermined quality assessment threshold to maintain a fixed percentage of 75% of drivers exceeding the first predetermined quality assessment threshold (e.g., if 50% of drivers are exceeding the threshold, the data source analysis platform 103 may reduce the first predetermined quality assessment threshold, or the like). It should be understood that the data source analysis platform 103 may maintain any number of quality assessment thresholds, and may set any number of corresponding flags accordingly.

At step 221, the data source analysis platform 103 may establish a connection with enterprise user device 104. For example, the data source analysis platform 103 may establish a fourth wireless data connection with enterprise user device 104 to link the data source analysis platform 103 to the enterprise user device 104. In one or more instances, the data source analysis platform 103 may identify whether or not a connection is already established with the enterprise user device 104. If a connection is already established with the enterprise user device 104, the data source analysis platform 103 might not re-establish the connection. If a connection is not already established with the enterprise user device 104, the data source analysis platform 103 may establish the fourth wireless data connection as described herein.

At step 222, data source analysis platform 103 may generate and send a message to the enterprise user device 104 that includes the device evaluation score generated at step 220. In one or more instances, the data source analysis platform 103 may also generate one or more commands directing the enterprise user device to display an enterprise user interface that includes the device evaluation score. In one or more instances, the data source analysis platform 103 may send the device evaluation score to the enterprise user device 104 via the communication interface 113 and while the fourth wireless data connection is established.

At step 223, the enterprise user device 104 may receive the message indicating the device evaluation score sent at step 222. In one or more instances, the enterprise user device 104 may receive one or more commands directing the enterprise user device 104 to display the enterprise user interface that includes the device evaluation score. In one or more instances, the enterprise user device 104 may receive the device evaluation score while the fourth wireless data connection is still established.

At step 224, the enterprise user device 104 may display an enterprise user interface that includes the device evaluation score. In some instances, the enterprise user device 104 may generate the enterprise user interface in response to receiving the one or more commands directing the enterprise user device 104 to display the enterprise user interface that includes the device evaluation score. In some instances, in displaying the enterprise user interface, the enterprise user device 104 may display a graphical user interface similar to graphical user interface 405, which is shown in FIG. 4. For example, the enterprise user device 104 may display a user interface that includes both the driving score, received at step 208, and the device evaluation score. Accordingly, by displaying the device evaluation score alongside the driving score, the enterprise user device 104 may facilitate interpretation of the driving score (e.g., whether or not it should be relied on based on the quality of the data collection services provided by the mobile device 102). In one or more instances, the enterprise user interface may be used by an employee of an enterprise organization (e.g., an insurance organization) to determine rates, discounts, premiums, targeted advertisements, or the like.

With reference to FIG. 2F, at step 225, the data source analysis platform 103 may generate and send a data collection interface to the mobile device 102. In some instances, in generating the data collection interface, the data source analysis platform 103 may generate an interface that includes the driving score (which may e.g., be received from the enterprise user device 104 and/or the driver score generation platform 105) and the device evaluation score. In some instances, the data source analysis platform 103 may generate and send one or more commands directing the mobile device 102 to display the data collection interface. In some instances, the data source analysis platform 103 may send the data collection interface to the mobile device 102 via the communication interface 113 and while the third wireless data connection is established.

At step 226, the mobile device 102 may receive the data collection interface sent at step 225. In one or more instances, the mobile device 102 may also receive one or more commands directing the mobile device 102 to display the data collection interface. In some instances, the mobile device 102 may receive the data collection interface while the third wireless data connection is established.

At step 227, the mobile device 102 may display the data collection interface. In one or more instances, the mobile device 102 may display the data collection interface in response to the one or more commands directing the mobile device 102 to display the data collection interface. In some instances, in displaying the data collection interface, the mobile device 102 may display a graphical user interface similar to graphical user interface 505, which is shown in FIG. 5. For example, the mobile device 102 may display both the driving score and the device evaluation score. In some instances, the data collection evaluation interface may be used by a customer of an enterprise organization (e.g., an insurance organization) to view their driving score (which may contribute to rates, discounts, premiums, targeted advertisements, or the like) and/or to evaluate data collection abilities of his or her mobile device.

At step 228, the data source analysis platform 103 may tune one or more thresholds and/or weighting values using in the one or more machine learning models used to compute the various scores. In some instances, the data source analysis platform 103 may tune the one or more thresholds and/or weighting values based on various scores computed for a plurality of drivers (e.g., data trends, score trends, or the like). Additionally or alternatively, the data source analysis platform 103 may tune the one or more thresholds and/or weighting values based on feedback received from the mobile device 102, the enterprise user device 104, or the like. Examples of this dynamic tuning are described further above with regard to steps 212-220.

At step 229, the data source analysis platform 103 may identify a model of the mobile device 102. For example, in some instances, along with the telematics data, the mobile device 102 may send a device identifier, model identifier, or the like, and the data source analysis platform 103 may identify the model accordingly. Additionally or alternatively, the data source analysis platform 103 may receive a message from the mobile device 102 that identifies the model of the mobile device 102, and the data source analysis platform 103 may identify the model accordingly. In some instances, the data source analysis platform 103 may store a model type of the mobile device 102 along with the device evaluation score (e.g., in the data source analysis database 112b, or the like).

Referring to FIG. 2G, at step 230, the data source analysis platform 103 may identify device evaluation scores for other drivers for whom telematics data was collected using other mobile devices (which may be of the same type or a different type than the mobile device 102). For example, the data source analysis platform 103 may compute device evaluation scores for additional drivers in a similar manner as described above with regard to steps 201-229.

At step 231, the data source analysis platform 103 may generate a driver comparison interface. For example, the data source analysis platform 103 may generate a distribution of the device evaluation scores, showing the frequency of each device evaluation score. In some instances, the data source analysis platform 103 may generate the driver comparison interface for a particular device type (e.g., a particular model or the like). In other instances, the data source analysis platform 103 may generate the driver comparison interface for a plurality of device types, each corresponding to telematics data received at the data source analysis platform 103.

At step 232, the data source analysis platform 103 may send the driver comparison interface to the enterprise user device 104. In some instances, the data source analysis platform 103 may also send one or more commands directing the enterprise user device 104 to display the driver comparison interface. In one or more instances, the enterprise user device 104 may send the driver comparison interface to the enterprise user device 104 via the communication interface 113 and while the fourth wireless data connection is established.

At step 233, the enterprise user device 104 may receive the driver comparison interface sent at step 232. In one or more instances, the enterprise user device 104 may also receive one or more commands directing the enterprise user device 104 to display the driver comparison interface. In some instances, the enterprise user device 104 may receive the driver comparison interface while the fourth wireless data connection is established.

Figure 6:
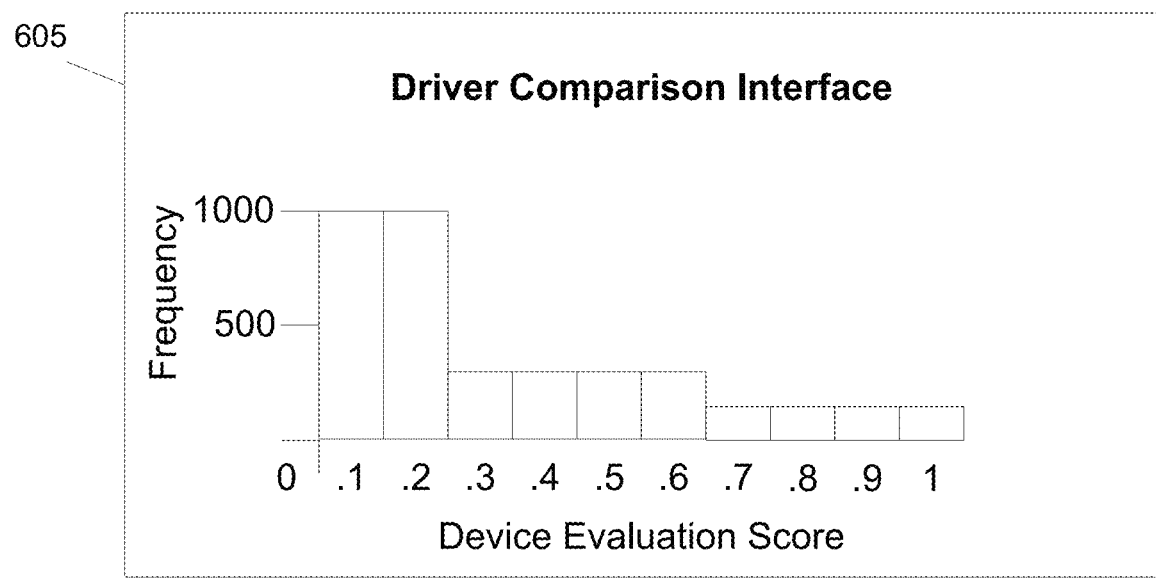

At step 234, the enterprise user device 104 may display the driver comparison interface. For example, the data source analysis platform 103 may generate a graphical user interface similar to graphical user interface 605, which is shown in FIG. 6. For example, the data source analysis platform 103 may generate a graphical user interface that illustrates a distribution of device evaluation scores, which may be used by an employee of an enterprise organization (e.g., an insurance institution) to interpret the device evaluation scores. For example, the data source analysis platform 103 may assign a device evaluation score of 0.2 to a particular device and, the employee may initially think this is a bad score, and may disregard the corresponding driving score. Upon review of the driver comparison interface, however, the employee may note that the largest number of device evaluation scores are either 0.1 or 0.2. Accordingly, the employee might not disregard the corresponding driving score.

Referring to FIG. 2H, at step 235, the data source analysis platform 103 may generate a mobile device rating interface. For example, the data source analysis platform 103 may identify a group of drivers corresponding to each of a plurality of mobile device types, and may compute an average device evaluation score for each group. The data source analysis platform 103 may then generate an interface to present a ranking of the various mobile device types based on their average device evaluation scores. The data source analysis platform 103 may send the mobile device rating interface to the enterprise user device 104 once it is generated. In some instances, the data source analysis platform 103 may send the mobile device rating interface to the enterprise user device 104 via the communication interface 113 and while the fourth wireless data connection is established. In some instances, the data source analysis platform 103 may generate and send one or more commands directing the enterprise user device 104 to display the mobile device rating interface.

At step 236, the enterprise user device 104 may receive the mobile device rating interface sent at step 235. In some instances, the enterprise user device 104 may receive the mobile device rating interface while the fourth wireless data connection is established. In some instances, the enterprise user device 104 may receive the one or more commands directing the enterprise user device 104 to display the mobile device rating interface.

Figure 7:
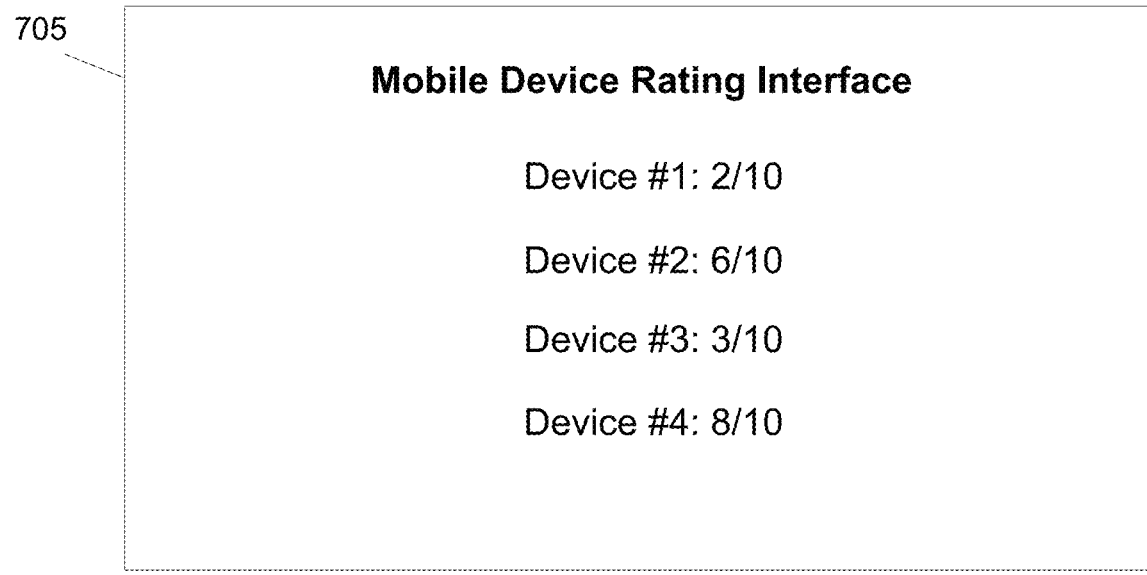

At step 237, the enterprise user device 104 may display the mobile device rating interface. In some instances, the enterprise user device 104 may display the mobile device rating interface in response to receiving the one or more commands directing the enterprise user device 104 to display the mobile device rating interface. In some instances, in displaying the mobile device rating interface, the enterprise user device 104 may display a graphical user interface similar to graphical user interface 705, which is shown in FIG. 7. For example, the enterprise user device 104 may display one or more types of mobile devices, and may display the average device evaluation score corresponding to each. In some instances, this may further assist employees of enterprise organizations (e.g., insurance institutions, or the like), in providing feedback to drivers about which mobile devices may be most effective in the collection of telematics data. Subsequently the event sequence may end.

Accordingly, one or more aspects of the systems and methods described herein may be used to address technical difficulties associated with evaluation of data collection abilities of various devices. By incorporating machine learning models and techniques, the process of evaluating device quality may be automated, scored, and ultimately used to interpret driving scores. In doing so, one or more of the systems and methods described herein may conserve processing resources in driving score generation (e.g., by only prompting for generation of driving scores if data quality exceeds a predetermined threshold) and in the calculation of rates, premiums, discounts, targeted advertisements, or the like (e.g., regardless of driving score, in some instances, the driving score may be ignored and no further processing may be performed if the device evaluation score does not exceed a predetermined threshold). Furthermore, one or more of the systems and methods described herein may provide context in which to view driving scores, and may increase accuracy of the driving scores (e.g., by ensuring the reliability of the telematics data on which they are based).

It should be understood that the steps described in the illustrative event sequence may be performed in any order without departing from the scope of the disclosure. For example, in some instances, the device evaluation score may be generated prior to generation of the driving score, and the driving score may only be generated if the device evaluation score exceeds a predetermined threshold. Accordingly, this may conserve backend processing resources used to compute driving scores that may be based on inaccurate data.

Figure 3:
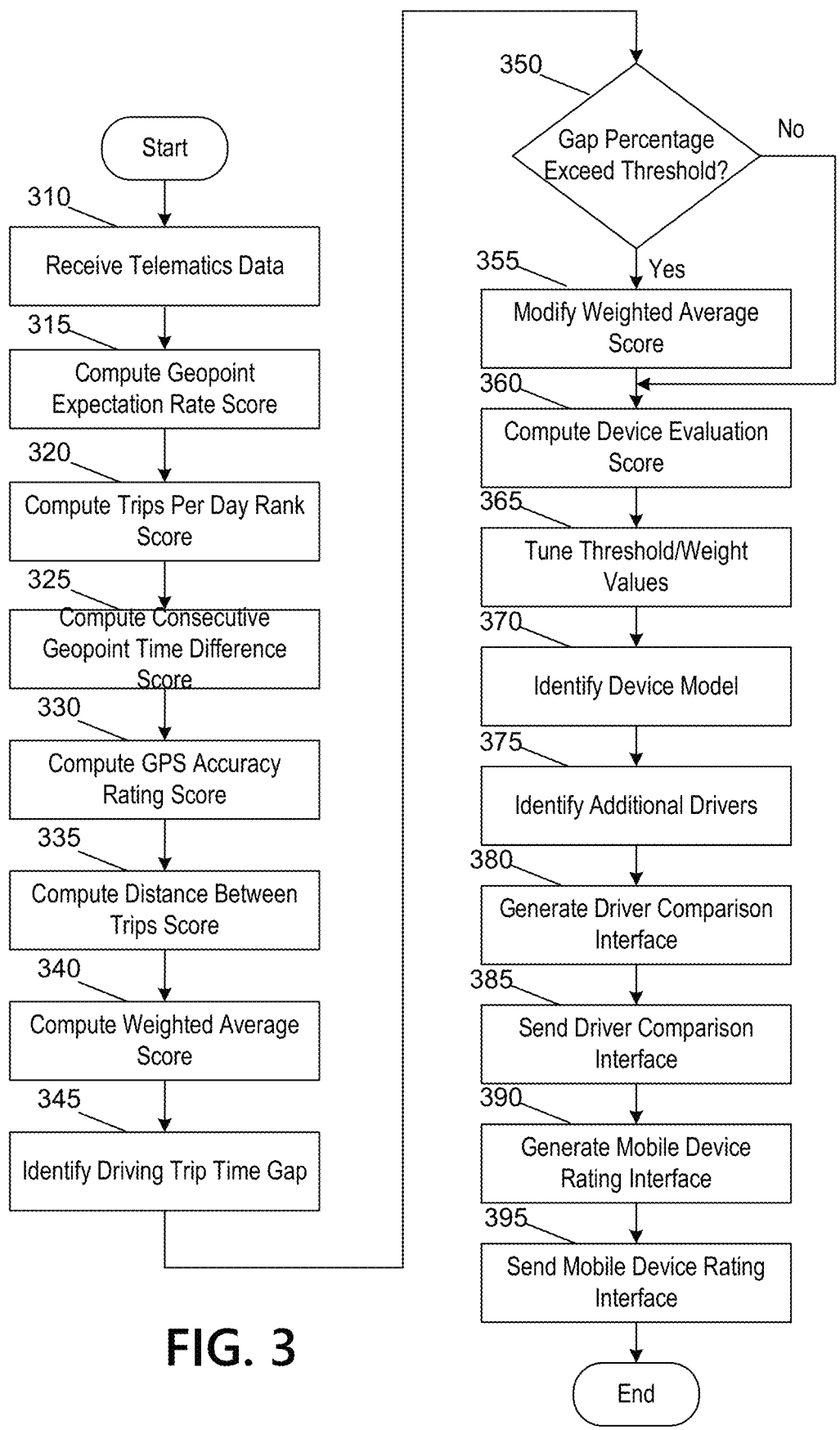
FIG. 3 depicts an illustrative method for implementing improved machine learning techniques to perform dynamic device quality evaluations in accordance with one or more example arrangements discussed herein.

FIG. 3 depicts an illustrative method that implemented improved machine learning techniques to perform dynamic device quality evaluations in accordance with one or more example embodiments. Referring to FIG. 3, at step 310, a computing platform having at least one processor, a communication interface, and memory may receive telematics data from a mobile device (or in some instances another device configured to collect GPS data). At step 315, the computing platform may compute a geopoint expectation rate score. At step 320, the computing platform may compute a trips per day rank score. At step 325, the computing platform may compute a consecutive geopoint time difference score. At step 330, the computing platform may compute a GPS accuracy rating score. At step 335, the computing platform may compute a distance between trips score. At step 340, the computing platform may compute a weighted average score based on the geopoint expectation rate score, the trips per day rank score, the consecutive geopoint time difference score, the GPS accuracy rating score, and the distance between trips score. At step 345, the computing platform may identify driving trip time gaps, and determine a percentage of the driving trip time gaps that exceeds a predetermined period of time. At step 350, the computing platform may determine whether the percentage of driving trip time gaps that exceeds the predetermined period of time exceeds a predetermined percentage. If the percentage of driving trip time gaps that exceeds the predetermined period of time does exceed the predetermined percentage, the computing platform may proceed to step 355. If the percentage of driving trip time gaps does not exceed the predetermined percentage, the computing platform may proceed to step 360.

At step 355, the computing platform may modify the weighted average score based on a predetermined percentage that was exceeded at step 350. At step 360, the computing platform may compute a device evaluation score. At step 365, the computing platform may tune one or more threshold and/or weight values used for score calculation. At step 370, the computing platform may identify a device model of the mobile device. At step 375, the computing platform may identify additional drivers and corresponding device evaluation scores. At step 380, the computing platform may generate a driver comparison interface. At step 385, the computing platform may send the driver comparison interface to an enterprise user device for display. At step 390, the computing platform may generate a mobile device rating interface. At step 395, the computing platform may send the mobile device rating interface to the enterprise user device for display.

It should be understood that while the systems and methods described herein in the illustrative event sequence, system diagrams, and methods, are primarily described in the context of insurance sales, the systems and methods described herein may be applied to any number of other fields and applications to assist with evaluation of device performance, or the like, without departing from the scope of the disclosure. Accordingly, the outlined systems and methods may be applied to a wide variety of use cases beyond insurance and may be applied by any user/individual (e.g., not merely an insurance representative, manager, customer, or the like). Furthermore, it should be understood that while the systems and methods described herein primarily refer to evaluation of a mobile device, it should be understood that the systems and methods described herein may apply to any other device that is figured to collect GPS and/or other data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and memory storing computer-readable instructions that, when executed by the at least one processor, cause the computing platform to:
   receive, from a mobile device, driving data;
   compute, using the driving data, a plurality of driving metrics, wherein each of the plurality of driving metrics includes: a geopoint expectation rate score, a trips per day rank score, a consecutive geopoint time difference score, a global positioning system (GPS) accuracy rating score, and a distance between consecutive trips score;
   compute, by applying one or more machine learning models to the plurality of driving metrics, a device evaluation score, wherein the device evaluation score indicates a quality of the driving data received from the mobile device; and
   set, based on the device evaluation score, one or more flags, wherein the one or more flags are accessible by a driver score generation platform, and wherein accessing each of the one or more flags causes the driver score generation platform to perform an action with regard to the mobile device.

2. The computing platform of claim 1, wherein the driving data:
   is collected by the mobile device, and
   corresponds to a plurality of driving trips performed over a predetermined period of time.

3. The computing platform of claim 2, wherein computing the geopoint expectation rate score comprises:
   identifying, for each of the plurality of driving trips, an expected number of GPS points to be recorded;
   identifying, for each of the plurality of driving trips, an actual number of GPS points recorded;
   dividing, for each of the plurality of driving trips, the actual number of GPS points recorded by the expected number of GPS points to be recorded, thereby resulting in a geopoint expectation rate for each of the plurality of driving trips;
   adding the geopoint expectation rate for each of the plurality of driving trips, thereby resulting in a total geopoint expectation rate;
   dividing the total geopoint expectation rate by a number of driving trips included in the plurality of driving trips, thereby resulting in an overall geopoint expectation rate; and
   computing, using the one or more machine learning models and based on the overall geopoint expectation rate, the geopoint expectation rate score, which indicates a quality of data collection performed by the mobile device based on geopoint collection.

4. The computing platform of claim 2, wherein computing the trips per day rank score comprises:
   computing, using the driving data and for a driver corresponding to the driving data, an average number of driving trips per day;
   identifying, using stored driving data corresponding to a plurality of additional drivers, an average number of driving trips per day corresponding to each of the plurality of additional drivers;
   comparing the average number of driving trips per day corresponding to the driver to the average number of driving trips per day corresponding to each of the plurality of additional drivers, thereby resulting in a trips per day rank for the driver; and
   computing, using the one or more machine learning models and based on the trips per day rank for the driver, the trips per day rank score for the driver, which indicates how many driving trips a day the driver performs in comparison to the plurality of additional drivers.

5. The computing platform of claim 2, wherein computing the consecutive geopoint time difference score comprises:
   identifying an expected time difference between consecutive geopoints;
   identifying, for each of the plurality of driving trips, an average actual time difference between the consecutive geopoints;
   comparing, for each of the plurality of driving trips, the average actual time difference between the consecutive geopoints to the expected time difference between the consecutive geopoints, thereby resulting in a consecutive geopoint time difference for each of the plurality of driving trips;
   computing an average of the consecutive geopoint time difference for each of the plurality of driving trips, thereby resulting in an overall consecutive geopoint time difference; and
   computing, using the one or more machine learning models and based on the overall consecutive geopoint time difference, the consecutive geopoint time difference score, which indicates a quality of data collection performed by the mobile device based on geopoint collection.

6. The computing platform of claim 2, wherein computing the GPS accuracy rating score comprises:
   identifying, for each of the plurality of driving trips, an accuracy radius for each GPS point included in each of the plurality of driving trips;
   computing, for each of the plurality of driving trips, an average accuracy radius using the identified accuracy radius for each GPS point included in each of the plurality of driving trips;
   computing, for a driver corresponding to the driving data, an overall average accuracy radius using the average accuracy radius corresponding to each of the plurality of driving trips; and
   computing, using the one or more machine learning models and based on the overall average accuracy radius, the GPS accuracy rating score, wherein the GPS accuracy rating score indicates a quality of data collection performed by the mobile device based on geopoint collection.

7. The computing platform of claim 2, wherein computing the distance between consecutive trips score comprises:
   identifying, between each pair of consecutive driving trips included in the plurality of driving trips, a distance between:
   an end point of a first driving trip, and
   a starting point of a second driving trip;
   computing a median distance of the identified distance between each pair of consecutive driving trips included in the plurality of driving trips, thereby resulting in a median distance between consecutive driving trips; and
   computing, using the one or more machine learning models and based on the median distance between consecutive driving trips, the distance between consecutive trips score, which indicates a quality of data collection performed by the mobile device based on geopoint collection.

8. The computing platform of claim 1, wherein the memory stores additional computer-readable instructions that, when executed by the at least one processor, cause the computing platform to:
identify, between each pair of consecutive driving trips included in a plurality of driving trips, a time difference between:
an end point of a first driving trip, and
a starting point of a second driving trip;
identify a percentage of the identified time difference that exceeds a predetermined period of time; and
compare the percentage to a first predetermined percentage value.

9. The computing platform of claim 8, wherein the memory stores additional computer-readable instructions that, when executed by the at least one processor, cause the computing platform to:
in response to identifying that the percentage exceeds the first predetermined percentage value:
subtract, from a weighted average score, a first fixed value, thereby resulting in the device evaluation score; and
in response to identifying that the percentage exceeds a second predetermined percentage value, wherein the second predetermined percentage value is greater than the first predetermined percentage value:
subtract, from the weighted average score, a second fixed value instead of the first fixed value, thereby resulting in the device evaluation score, wherein the second fixed value is greater than the first fixed value.

10. The computing platform of claim 9, wherein computing the weighted average score comprises applying:

$$\text{Weighted Average Score} = \frac{\alpha V + \beta W + \gamma X + \delta Y + \varepsilon Z}{5},$$

wherein:
$\alpha$ is a first weight value applied to the geopoint expectation rate score,
V is the geopoint expectation rate score,
$\beta$ is a second weight value applied to the trips per day rank score,
W is the trips per day rank score,
$\gamma$ is a third weight value applied to the consecutive geopoint time difference score,
X is the consecutive geopoint time difference score,
$\delta$ is a fourth weight value applied to the GPS accuracy rating score,
Y is the GPS accuracy rating score,
$\varepsilon$ is a fifth weight value applied to the distance between consecutive trips score, and
Z is the distance between consecutive trips score.

11. The computing platform of claim 1, wherein setting the one or more flags comprises:
comparing the device evaluation score to a first predetermined quality assessment threshold;
in response to identifying that the device evaluation score does not exceed the first predetermined quality assessment threshold:
setting a first flag corresponding to the mobile device, wherein the first flag is accessible by the driver score generation platform and wherein accessing the first flag causes the driver score generation platform to add the mobile device to a stored list of devices from which the driving data will not be used in driving score computations; and
in response to identifying that the device evaluation score exceeds the first predetermined quality assessment threshold:
comparing the device evaluation score to a second predetermined quality assessment threshold, and
in response to identifying that the device evaluation score does not exceed the second predetermined quality assessment threshold:
setting a second flag corresponding to the mobile device, wherein the second flag is accessible by the driver score generation platform and wherein accessing the second flag causes the driver score generation platform:
to generate an alert indicating that the device evaluation score did not exceed the second predetermined quality assessment threshold and requesting that the mobile device be replaced, and
send, to the mobile device, the alert.

12. A method at a computing platform comprising at least one processor, a communication interface, and memory, the method comprising:
receiving, from a mobile device, driving data, wherein the driving data is collected by the mobile device and corresponds to a plurality of driving trips performed over a predetermined period of time;
computing, using the driving data, a plurality of driving metrics, wherein each of the plurality of driving metrics includes: a geopoint expectation rate score, a trips per day rank score, a consecutive geopoint time difference score, a global positioning system (GPS) accuracy rating score, and a distance between consecutive trips score;
computing, using the plurality of driving metrics, a weighted average score;
identifying, between each pair of consecutive driving trips included in the plurality of driving trips, a time difference between:
an end point of a first driving trip, and
a starting point of a second driving trip;
identifying a percentage of the identified time difference that exceeds the predetermined period of time; and
comparing the percentage to a first predetermined percentage value;
in response to identifying that the percentage exceeds the first predetermined percentage value:
subtracting, from the weighted average score, a first fixed value, thereby resulting in a device evaluation score; and
causing output of the device evaluation score, wherein the device evaluation score indicates a quality of the driving data received from the mobile device.

13. The method of claim 12, wherein computing the geopoint expectation rate score comprises:
identifying, for each of the plurality of driving trips, an expected number of GPS points to be recorded;
identifying, for each of the plurality of driving trips, an actual number of GPS points recorded;
dividing, for each of the plurality of driving trips, the actual number of GPS points recorded by the expected number of GPS points to be recorded, thereby resulting in a geopoint expectation rate for each of the plurality of driving trips;

adding the geopoint expectation rate for each of the plurality of driving trips, thereby resulting in a total geopoint expectation rate;

dividing the total geopoint expectation rate by a number of driving trips included in the plurality of driving trips, thereby resulting in an overall geopoint expectation rate; and computing, using one or more machine learning models and based on the overall geopoint expectation rate, the geopoint expectation rate score, which indicates a quality of data collection performed by the mobile device based on geopoint collection.

14. The method of claim 12, wherein computing the trips per day rank score comprises:

computing, using the driving data and for a driver corresponding to the driving data, an average number of driving trips per day;

identifying, using stored driving data corresponding to a plurality of additional drivers, an average number of driving trips per day corresponding to each of the plurality of additional drivers;

comparing the average number of driving trips per day corresponding to the driver to the average number of driving trips per day corresponding to each of the plurality of additional drivers, thereby resulting in a trips per day rank for the driver; and computing, using one or more machine learning models and based on the trips per day rank for the driver, the trips per day rank score for the driver, which indicates how many driving trips a day the driver performs in comparison to the plurality of additional drivers.

15. The method of claim 12, wherein computing the consecutive geopoint time difference score comprises:

identifying an expected time difference between consecutive geopoints;

identifying, for each of the plurality of driving trips, an average actual time difference between the consecutive geopoints;

comparing, for each of the plurality of driving trips, the average actual time difference between the consecutive geopoints to the expected time difference between the consecutive geopoints, thereby resulting in a consecutive geopoint time difference for each of the plurality of driving trips;

computing an average of the consecutive geopoint time differences for the plurality of driving trips, thereby resulting in an overall consecutive geopoint time difference; and computing, using one or more machine learning models and based on the overall consecutive geopoint time difference, the consecutive geopoint time difference score, which indicates a quality of data collection performed by the mobile device based on geopoint collection.

16. The method of claim 12, wherein computing the GPS accuracy rating score comprises:

identifying, for each of the plurality of driving trips, an accuracy radius for each GPS point included in each of the plurality of driving trips;

computing, for each of the plurality of driving trips, an average accuracy radius using the identified accuracy radius for each GPS point included in each of the plurality of driving trips;

computing, for a driver corresponding to the driving data, an overall average accuracy radius using the average accuracy radius corresponding to each of the plurality of driving trips; and computing, using one or more machine learning models and based on the overall average accuracy radius, the GPS accuracy rating score, wherein the GPS accuracy rating score indicates a quality of data collection performed by the mobile device based on geopoint collection.

17. The method of claim 12, wherein computing the distance between consecutive trips score comprises:

identifying, between each pair of consecutive driving trips included in the plurality of driving trips, a distance between:
 the end point of the first driving trip, and
 the starting point of the second driving trip;

computing a median distance of the identified distance between each pair of consecutive driving trips included in the plurality of driving trips, thereby resulting in the median distance between the consecutive driving trips; and computing, using one or more machine learning models and based on the median distance between the consecutive driving trips, the distance between consecutive trips score, which indicates a quality of data collection performed by the mobile device based on geopoint collection.

18. The method of claim 12, further comprising:

comparing the device evaluation score to a first predetermined quality assessment threshold;

in response to identifying that the device evaluation score does not exceed the first predetermined quality assessment threshold:

setting a first flag corresponding to the mobile device, wherein the first flag is accessible by a driver score generation platform and wherein accessing the first flag causes the driver score generation platform to add the mobile device to a stored list of devices from which the driving data will not be used in driving score computations; and in response to identifying that the device evaluation score exceeds the first predetermined quality assessment threshold:

comparing the device evaluation score to a second predetermined quality assessment threshold, and in response to identifying that the device evaluation score does not exceed the second predetermined quality assessment threshold:

setting a second flag corresponding to the mobile device, wherein the second flag is accessible by the driver score generation platform and wherein accessing the second flag causes the driver score generation platform:

to generate an alert indicating that the device evaluation score did not exceed the second predetermined quality assessment threshold and requesting that the mobile device be replaced, and send, to the mobile device, the alert.

19. The method of claim 12, wherein computing the weighted average score comprises applying the following formula:

$$\text{Weighted Average Score} = \frac{\alpha V + \beta W + \gamma X + \delta Y + \varepsilon Z}{5},$$

wherein:

α is a first weight value applied to the geopoint expectation rate score,

V is the geopoint expectation rate score,

β is a second weight value applied to the trips per day rank score,

W is the trips per day rank score,

γ is a third weight value applied to the consecutive geopoint time difference score, X is the consecutive geopoint time difference score, δ is a fourth weight value applied to the GPS accuracy rating score, Y is the GPS accuracy rating score, ε is a fifth weight value applied to the distance between consecutive trips score, and Z is the distance between consecutive trips score.

20. One or more non-transitory computer-readable media storing instructions that, when executed by a computing platform comprising at least one processor, a communication interface, and memory, cause the computing platform to:

receive, from a mobile device, driving data;

compute, using the driving data, a plurality of driving metrics, wherein each of the plurality of driving metrics includes a geopoint expectation rate score, a trips per day rank score, a consecutive geopoint time difference score, a global positioning system (GPS) accuracy rating score, and a distance between consecutive trips score;

compute, using the plurality of driving metrics, a weighted average score;

compute, based on the weighted average score, a device evaluation score indicating a quality of the driving data received from the mobile device;

compare the device evaluation score to a first predetermined quality assessment threshold; and in response to identifying that the device evaluation score does not exceed the first predetermined quality assessment threshold:

set a first flag corresponding to the mobile device, wherein the first flag is accessible by a driver score generation platform and wherein accessing the first flag causes the driver score generation platform to add the mobile device to a stored list of devices from which the driving data will not be used in driving score computations.

* * * * *